United States Patent [19]
Hohl et al.

[11] Patent Number: 6,035,422
[45] Date of Patent: Mar. 7, 2000

[54] DATA PROCESSING SYSTEM FOR CONTROLLING EXECUTION OF A DEBUG FUNCTION AND METHOD THEREFOR

[75] Inventors: William A. Hohl, Pflugerville, Tex.; Joseph C. Circello, Phoenix, Ariz.

[73] Assignee: Motorola, Inc., Schaumburg, Ill.

[21] Appl. No.: 08/857,006

[22] Filed: May 15, 1997

Related U.S. Application Data

[62] Division of application No. 08/521,249, Aug. 30, 1995, abandoned.

[51] Int. Cl.[7] .................................................. G06F 11/00
[52] U.S. Cl. ............................ 714/35; 714/34; 712/227
[58] Field of Search ........................... 395/183.11, 183.1, 395/183.14, 183.16, 183.18, 183.09, 183.2, 183.21, 184.01, 185.04; 714/35, 34, 38, 40, 42, 33, 44, 45, 47, 51; 712/227, 244

[56] References Cited

U.S. PATENT DOCUMENTS

| | | |
|---|---|---|
| 3,937,938 | 2/1976 | Matthews . |
| 4,080,650 | 3/1978 | Beckett ................................. 364/200 |
| 4,338,660 | 7/1982 | Kelley et al. ......................... 364/200 |
| 4,635,193 | 1/1987 | Moyer et al. ......................... 364/200 |
| 4,675,646 | 6/1987 | Lauer ................................. 340/146.2 |
| 4,881,228 | 11/1989 | Shouda ................................. 371/19 |
| 5,053,949 | 10/1991 | Allison et al. ........................ 364/200 |
| 5,084,814 | 1/1992 | Vaglica et al. ........................ 395/325 |
| 5,129,078 | 7/1992 | Groves et al. ........................ 395/550 |
| 5,165,027 | 11/1992 | Krauskopf ............................. 395/400 |
| 5,179,695 | 1/1993 | Shouda ................................. 395/575 |
| 5,204,864 | 4/1993 | Won .................................... 371/29.5 |
| 5,291,497 | 3/1994 | Ulrich et al. ......................... 371/19 |
| 5,301,198 | 4/1994 | Kawasaki .............................. 371/19 |
| 5,313,608 | 5/1994 | Takai ................................. 395/425 |
| 5,317,711 | 5/1994 | Bourekas et al. ...................... 395/425 |
| 5,321,828 | 6/1994 | Phillips et al. ...................... 395/500 |
| 5,359,608 | 10/1994 | Belz et al. .......................... 371/16.5 |
| 5,361,392 | 11/1994 | Fourcroy et al. ..................... 395/800 |
| 5,410,685 | 4/1995 | Banda et al. ......................... 395/575 |
| 5,448,744 | 9/1995 | Eifert et al. ........................ 395/800 |
| 5,479,652 | 12/1995 | Dreyer et al. ....................... 395/183 |

(List continued on next page.)

FOREIGN PATENT DOCUMENTS

| | | | |
|---|---|---|---|
| 2266606 | 11/1993 | European Pat. Off. ........ | G06F 11/22 |
| 0636976 | 2/1995 | European Pat. Off. ........ | G06F 11/00 |
| 4302902 | 8/1994 | Germany ........................ | G06F 9/30 |

OTHER PUBLICATIONS

Circello, Joe, Motorola, Inc., "Optimizing a Variable–Length ISA for Consumer Class Applications," Microprocessor Forum Oct. 18–19, 1994, pp. 18–1 to 18–2.

Circello, Joe, Motorola, Inc. "ColdFire: A Hot Architecture," May 1995 Byte, pp. 173–174.

Motorola, Inc., "PowerPC™ 601 RISC Microprocessor User's Manual," 1993, pp. 2–41, to 2–44, 5–49 to 5–50.

Motorola, Inc. "DSP56116 Digital Signal Processor User's Manual," 1990, pp. 16–1 to 16–20.

(List continued on next page.)

*Primary Examiner*—Dieu-Minh T. Le
*Attorney, Agent, or Firm*—John Gustav Larson; Michael P. Noonan

[57] ABSTRACT

A central processing unit (2) and a debug module (10) execute concurrent operations without requiring a data processor (3) to operate in a special debug mode. The use of a bus (25) to communicate data, address, and control information between a core (9) and debug module (10) allows debug module (10) to have access the same internal registers and memory locations as central processing unit (2). While debug module (10) and central processing unit (2) both have the ability to access the same internal registers and memory locations, central processing unit (2) may not modify a value stored in a plurality of breakpoint registers (50) when an Inhibit Processor Writes to Debug Registers (IPW) bit in a CSR (FIG. 8) of a plurality of control registers (40) is set. The IPW bit may only be modified by a command provided by an external development system (7).

16 Claims, 8 Drawing Sheets

U.S. PATENT DOCUMENTS

| | | |
|---|---|---|
| 5,488,688 | 1/1996 | Gonzales et al. .................... 395/183.1 |
| 5,491,793 | 2/1996 | Somasundaram et al. ............. 395/183 |
| 5,530,804 | 6/1996 | Edgington et al. ..................... 395/183 |
| 5,537,536 | 7/1996 | Groves ................................... 395/183 |
| 5,581,695 | 12/1996 | Knoke et al. ........................... 395/183 |
| 5,621,886 | 4/1997 | Alpert et al. ....................... 395/183.14 |
| 5,640,542 | 6/1997 | Whitsel et al. ......................... 395/500 |
| 5,680,620 | 10/1997 | Ross ..................................... 395/183.1 |
| 5,694,589 | 12/1997 | Glew et al. .............................. 395/568 |
| 5,740,413 | 4/1998 | Alpert et al. ............................ 395/568 |
| 5,828,825 | 10/1998 | Eskandari et al. ................. 395/183.03 |

OTHER PUBLICATIONS

Motorola, Inc., "DSP96002 IEEE Floating–Point Dual–Port Processor User's Manual," 1989, pp. 10–2 to 10–22.

Motorola, Inc., "MC68000, MC68008, MC6810, MC68HC000 8–/16–/32–Bit Microprocessors User's Manual Sixth Edition," 1989, pp. 6–1 to 6–12.

Motorola, Inc., "MC68040 32–Bit Microprocessor User's Manual," 1989, pp. 9–13 to 9–14.

Motorola, Inc., "MC68332 User's Manual," 1990, pp. 7–5 to 7–6, 7–11 to 7–12, 9–1 to 9–8.

Motorola, Inc., "MC68340 Integrated Processor User's Manual," 1990, pp. 5–67 to 5–70, 5–75 to 5–78, 5–93 to 5–124.

Margulis, Neal, Intel i860™ Microprocessor Architecture, 1990, pp. 249–250.

Intel, "80386 Programmer's Reference Manual," 1986, pp. 12–1 to 12–9.

System/370 Principles of Operation; Control, "Positions within Trace Entry" / "Program–Event" Chapter 4; pp. 4–15 through 4–24.

Case, et al; "Architecture of the IBM System/370"; IBM Communications of the ACM; vol. 21, No. 1, pp. 73–96 (1978).

IBM System/370 Principles of Operation; "System Control"; GA22–7000–4, File No. S/370–01 pp. 35–44 (1974).

Perry; "Dynamic Debugging"; IBM Technical Disclosure Bulletin; vol. 15; No. 9; pp. 2953 (1973).

Chilinski, et al.; "Address Comparison"; IBM Technical Dislcosre Bulletin; vol. 15, No. 5; pp. 1632–1633 (1972).

Sakalay; "Program Event Recording"; IBM Technical Disclosure Bulletin; vol. 15; No. 4; pp. 1332–1333 (1972).

Bullions III, et al.; "Dynamic Enabling/Disabling of Program Event Recording Range Compare"; IBM Technical Disclosure Bulletin; vol. 20; No. 9; pp. 3608–3609 (1978).

FIG.6

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| RM | SZM | | TTM | | TMM | | | R | SZ | | TT | | TM | | |

FIG.7

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| TRC | EBL | EDLW | EDWL | EDLL | EDWU | EDUM | EDLM | EDUU | DI | AI | EAR | EAL | EPC | PCI | |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 00 | EBL | EDLW | EDWL | EDLL | EDWU | EDUM | EDLM | EDUU | DI | AI | EAR | EAL | EPC | PCI | |

FIG.8

| 31 | 28 | 27 | 26 | 25 | 24 | 23 | 17 | 16 |
|---|---|---|---|---|---|---|---|---|
| STATUS | FOF | TRG | HALT | BKPT | RESERVED | | IPW | |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| MAP | TRC | EMU | DDC | RFU | BTB | END | NPL | IPI | SSM | SBD | KAD | KOD | KCD | | |

| DDATA[3:0], CSR[31:28] | BREAKPOINT STATUS |
|---|---|
| $0 | NO BREAKPOINTS ENABLED |
| $1 | WAITING FOR LEVEL 1 BREAKPOINT |
| $2 | LEVEL 1 BREAKPOINT TRIGGERED |
| $3-4 | RESERVED |
| $5 | WAITING FOR LEVEL 2 BREAKPOINT |
| $6 | LEVEL 2 BREAKPOINT TRIGGERED |
| $7-$F | RESERVED |

*FIG. 9*

| PST[3:0] | DEFINITION |
|---|---|
| 0000 | CONTINUE EXTENSION |
| 0001 | BEGIN EXECUTION OF AN INSTRUCTION |
| 0010 | RESERVED |
| 0011 | ENTRY INTO USER-MODE |
| 0100 | BEGIN EXECUTION OF PULSE INSTRUCTION |
| 0101 | BEGIN EXECUTION OF TAKEN BRANCH |
| 0110 | RESERVED |
| 0111 | BEGIN EXECUTION OF RTE INSTRUCTION |
| 1000 | BEGIN 1-BYTE TRANSFER FOR DDATA |
| 1001 | BEGIN 2-BYTE TRANSFER FOR DDATA |
| 1010 | BEGIN 3-BYTE TRANSFER FOR DDATA |
| 1011 | BEGIN 4-BYTE TRANSFER ON DDATA |
| 1100 | EXCEPTION PROCESSING |
| 1101 | EMULATOR-MODE ENTRY EXCEPTION PROCESSING |
| 1110 | PROCESSOR IS STOPPED, WAITING FOR INTERRUPT |
| 1111 | PROCESSOR IS HALTED |

*FIG. 10*

| LAST | DSOC | AGEX | | | | | | | | |
|---|---|---|---|---|---|---|---|---|---|---|
| JMP (A0) | | DSOC | AGEX | | | | | | | |
| TARGET | | | IAG | IC | DSOC | AGEX | | | | |
| TARGET + $4 | | | | IAG | IC | DSOC | AGEX | | | |
| CPST | | | | $5 | $9 | $0 | TARGET | 7:4 | 11:8 | 15:12 |
| INTERNAL DDATA | | | | $0 | $0 | $0 | 3:0 | | | |
| PST PINS | | | | | $5 | $9 | $0 | TARGET | 7:4 | 11:8 | 15:12 |
| DDATA PINS | | | | | $0 | $0 | $0 | 3:0 | | |

FIG. 11

DATA PROCESSING SYSTEM FOR CONTROLLING EXECUTION OF A DEBUG FUNCTION AND METHOD THEREFOR

This is a divisional of application Ser. No. 08/521,249, filed Aug. 30, 1995 now abandoned.

CROSS REFERENCE TO RELATED, COPENDING APPLICATIONS

This application is related to our commonly assigned copending patent applications entitled:

"A Data Processing System For Performing a Trace Function and Method Therefor" by Joseph C. Circello et al., Ser. No. 08/520,945 and filed concurrently herewith now allowed;

"A Data Processing System For Performing a Breakpoint Function and Method Therefor" by Christopher N. Hinds et al., Ser. No. 08/520,948 and filed concurrently herewith;

"A Data Processing System For Performing A Debug Function And Method Therefor" by Joseph C. Circello et al., Ser. No. 08/520,943 and filed concurrently herewith, issued on Apr. 7, 1998 as U.S. Pat. No. 5,737,516;

"A Method and Circuit for Initializing a Data Processing System" by Joseph C. Circello, Ser. No. 08/520,949 and filed concurrently herewith, issued on Dec. 30, 1997 as U.S. Pat. No. 5,704,034; and "A Data Processing System Having a Debug Mode Which Is an Architectural Extension of the Data Processing System and Fetches and Executes Debug Instructions and Processor Speed" by Gregory C. Edgington, Joseph C. Circello, Daniel M. McCarthy, and Richard Duerden, Ser. No. 08/242,767, filed May 16, 1994, and issured on Jun. 25, 1996 as U.S. Pat. No. 5,530,804.

FIELD OF THE INVENTION

The present invention relates in general to a data processing system, and more particularly to a method and apparatus for performing a debug function in a data processing system.

BACKGROUND OF THE INVENTION

When a data processing system fails to operate as designed, various analysis techniques may be used to identify a source of the failure. Generally, trace functions and breakpoint functions are implemented within the data processing system to aid in the isolation of failing circuitry and the correction of failing software programs.

Trace functions provide a means for allowing an external user to observe intermediate results of execution of a data processing operation. Trace functions generally provide a status of selected registers and memory included in the data processing system after each instruction or a predetermined group of instructions of a software program is executed by the data processing system. By reflecting the status of selected registers and memory, the trace function provides the external user with very detailed information about an internal programming model of a data processor or data processing system. With this information, many types of errors may be identified and subsequently corrected. Breakpoint functions also provide a method for identifying and isolating erroneous software code or faulty circuits in a data processing system. A breakpoint function is, in effect, where a preprogrammed event occurs causing a break in a software program. Data is then retrieved to determine a status of the software program. Like the trace function, the breakpoint function allows the external user to ascertain a status of each of the selected registers and memory such that data processing errors may be identified.

Both the trace function and the breakpoint function have been integrated in currently available data processing systems to provide the previously described isolation and identification capabilities. For example, the i960 Jx microprocessor, available from the Intel Corporation of Santa Clara, Calif., is an integrated circuit microprocessor which has internal breakpoint registers which generate trace events and trace faults. In the i960 Jx microprocessor, the internal breakpoint registers are dedicated to trapping on either instruction execution addresses or on the addresses of various types of data accesses. To use the tracing facility of the i960 Jx Microprocessor, software which utilizes the microprocessor must provide fault handling procedures or interface with a debugging monitor program. Software is also required to manipulate several registers and control bits to enable various tracing modes and to selectively enable or disable the tracing function.

Similarly, the 80486 microprocessor, also available from the Intel Corporation of Santa Clara, Calif., is an integrated circuit microprocessor which has internal breakpoint registers and is able to perform the trace function. In the 80486 microprocessor, a breakpoint instruction is implemented for use by internal software debugger devices, where internal software simply refers to software running on the data processing system. During general operation, a software debug program may implement the breakpoint instruction at all desired breakpoints which depend on a type of software code executed. The 80486 microprocessor also provides a mechanism for implementing a single step trap function which executes an interrupt after the trap routine is executed.

While the i960 Jx microprocessor and 80486 microprocessor integrate the breakpoint and trace functions, the debug functionality of the microprocessors requires the microprocessors to suspend normal operation and enter into a special debug exception routine. During the debug exception routine, the microprocessors do not function as they would during normal operation and, therefore, the failures in circuitry or software may not occur in a similar manner. Consequently, the external user will not be able to verify and isolate a root cause of the failures in either microprocessor when the real-time failing conditions do not actually occur.

Furthermore, both the i960 Jx microprocessor and the 80486 microprocessor require either an internal software debug program which is executed by the microprocessor to provide program control during the breakpoint and trace functions. The use of such debug control provides a very intrusive manner of debugging which requires a significant amount of overhead. As well, the use of debug software may not provide a true reflection of a faulty circuit or sequence in the failing microprocessor.

Therefore, a need exists for a data processor which provides both real time trace and real time debug functions. If both the trace and debug functions are executed in a manner which reflects operation of the data processor during normal operation, and not in a special debug mode of operation, the external user will more accurately identify and correct failures in the circuitry and software of the data processor.

BRIEF DESCRIPTION OF THE DRAWINGS

FIG. 6 illustrates, in block diagram form, an address attribute breakpoint register of the plurality of hardware breakpoint registers of FIG. 5;

FIG. 7 illustrates, in block diagram form, a trigger definition register of the plurality of control registers of FIG. 4;

FIG. 8 illustrates, in block diagram form, a configuration status register of the plurality of the plurality of control registers of FIG. 4;

FIG. 9 illustrates, in tabular form, an output of a plurality of breakpoint signals of the debug module of FIG. 2;

FIG. 10 illustrates, in tabular form, an output of a plurality of processor status signals of the debug module of FIG. 2;

FIG. 11 illustrates, in graphical form, a pipeline timing example in accordance with one embodiment of the present invention.

DESCRIPTION OF THE PREFERRED EMBODIMENTS

The present invention provides a data processing system which is able to provide both breakpoint and trace functions in real time and without requiring a special mode of operation. Additionally, both a breakpoint and a trace function may be executed by the data processing system without requiring a data processor being tested to provide address and data information via an external address bus or an external data bus. This independence from external busses enables the present invention to provide an efficient debugging mechanism which may be applied to various data processor systems regardless of a size, type, protocol, or even presence of an external bus.

Additionally, the present invention provides an architecture and methodology for implementing trace and breakpoint functions in real time. The data processor being tested is not typically required to halt or modify operation before the trace and breakpoint functions are executed. Therefore, the present invention enables an external user to isolate failures while the data processor is operating normally and not in a special mode for debugging operations. As well, the present invention provides data to the external user directly upon executing a real time trace or real time debug operation. Unlike prior art devices which require either an external software monitor program or an external emulator to perform a trace function or a debug function, the present invention provides data which indicates a current operation of the data processor to an external user. Thus, the present invention provides trace and debug functionality without significantly intruding or adversely affecting the data processor. Operation of the present invention will be subsequently discussed in greater detail.

In a following discussion, the connectivity and operation of one embodiment of a data processing system which implements the present invention will be provided in greater detail.

Connectivity of the Present Invention

In the following description of the connectivity of the present invention, the term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

Furthermore, the symbol "$" preceding a number indicates that the number is represented in its hexadecimal or base sixteen form. The symbol "%" preceding a number indicates that the number is represented in its binary or base two form.

Figure 1:
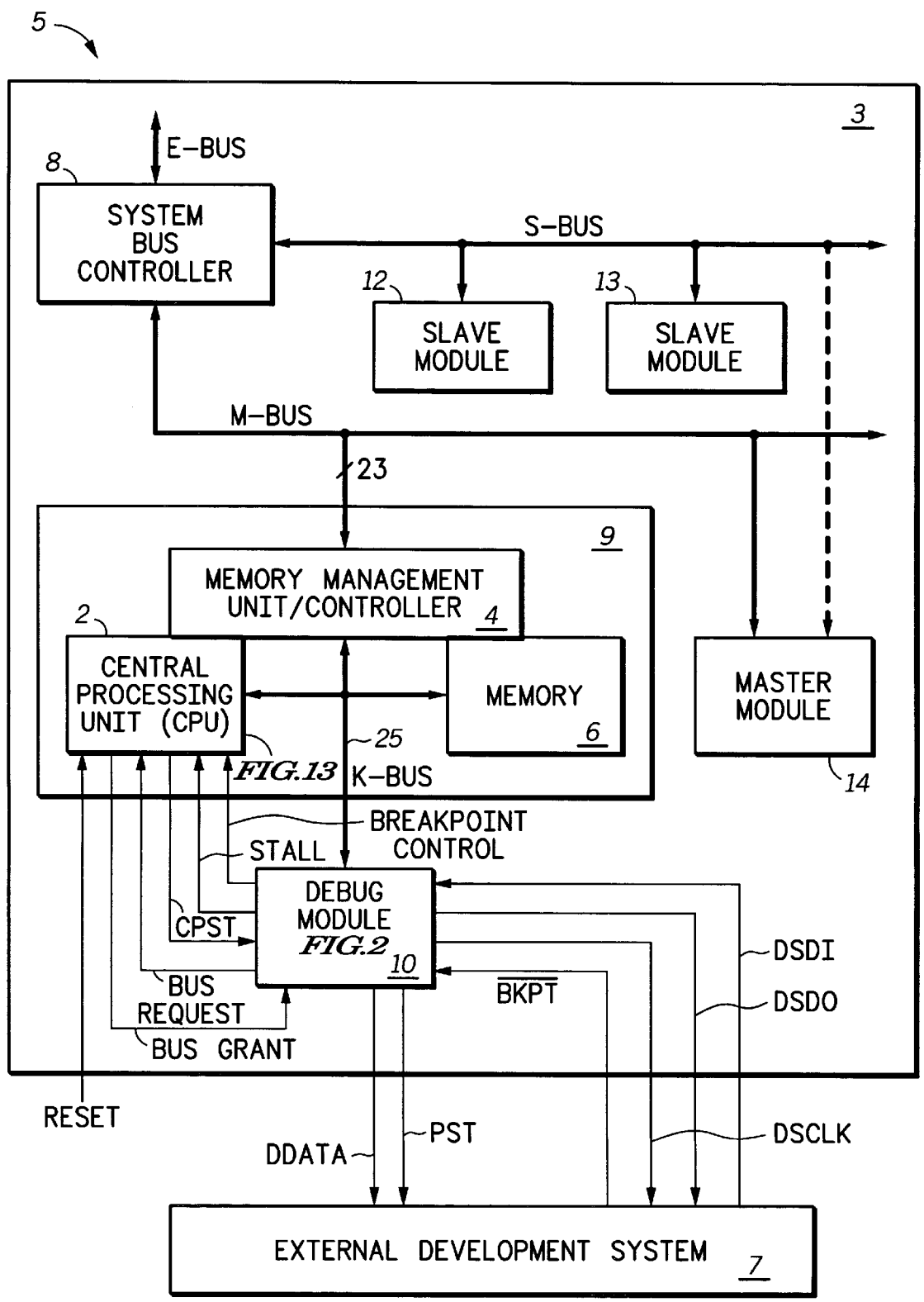
FIG. 1 illustrates, in block diagram form, a data processing system in accordance with one embodiment of the present invention.

Referring now to FIG. 1, FIG. 1 illustrates a data processing system 5 in accordance with one embodiment of the present invention. Data processing system 5 comprises a data processor 3 and an external development system 7. Data processor 3 includes a system bus controller 8, a core 9, a slave module 12, a slave module 13, a master module 14, and a debug module 10. System bus controller 8 is coupled to an external device (not illustrated herein) via an E-Bus. System bus controller 8 is coupled to slave module 12 and slave module 13 via an S-Bus. The S-Bus is a slave module bus. System bus controller 8 is coupled to core 9 and master module 14 via an M-Bus 23. M-Bus 23 is a master module bus.

Core 9 comprises a central processing unit (CPU) 2, a memory management unit (MMU)/controller 4, and a memory 6. Central processing unit 2, MMU/controller 4, memory 6, and debug module 10 are each coupled to one another via a K-bus 25. Both central processing unit 2 and memory 6 are also directly connected to MMU/controller 4. MMU/controller 4 provides information to a remaining portion of data processing system 5 via a M-Bus 23. Central processing unit 2 is coupled to debug module 10 to provide a CPST signal and to receive a Stall signal. CPU 2 also receives a Reset signal from an external device. Debug module 10 provides a processor status (PST) signal, a debug data (DDATA) signal, and a development serial data out (DSDO) signal to an external user. Debug module 10 receives a development serial data in (DSDI) signal, a development serial dock (DSCLK), and a breakpoint ($\overline{BKPT}$) signal from a device (not shown herein) external to data processing system 5.

Figure 2:
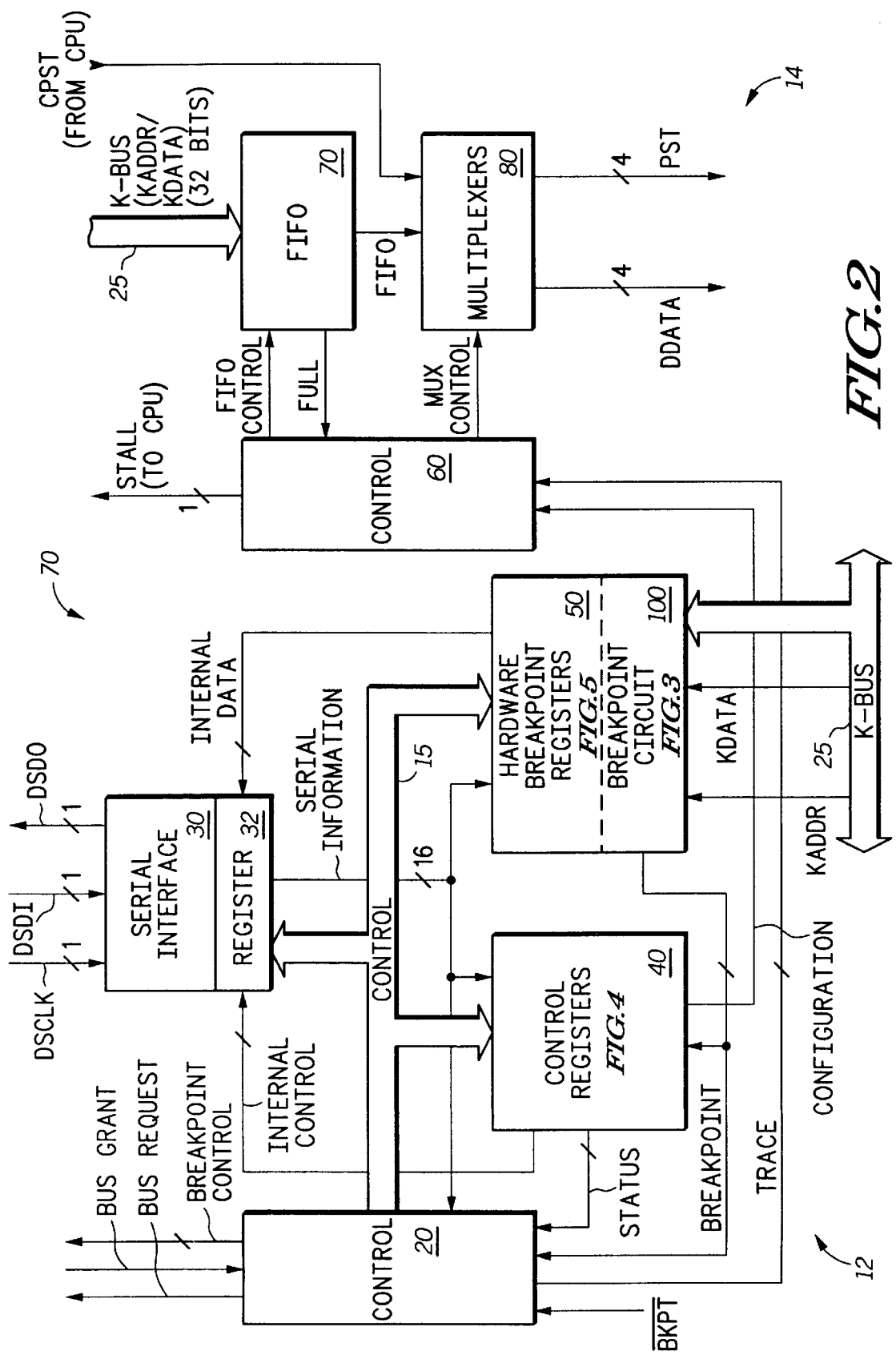
FIG. 2 illustrates, in block diagram form, a portion of a debug module of the data processing system of FIG. 1.

FIG. 2 illustrates debug module 10 in greater detail. Debug module 10 includes a control circuit 20, a serial interface 30, a register 32, a plurality of control registers 40, a plurality of hardware breakpoint registers 50, a control circuit 60, a FIFO 70, a plurality of multiplexers 80, and a breakpoint circuit 100.

The $\overline{BKPT}$ signal is provided to control circuit 20 via an external integrated circuit pin (not shown in detail in FIG. 2). Control circuit 20 is coupled to the plurality of control registers 40 to receive a Status signal having a plurality of bits. Control circuit 20 is coupled to the breakpoint circuit 100 to receive a Breakpoint signal having a plurality of bits. Control circuit 20 is coupled to control circuit 60 to provide a Trace signal having a plurality of bits. Control circuit 20 is coupled to the plurality of control registers 40, the plurality of hardware breakpoint registers 50, and register 32 via a Control bus 15. Control circuit 20 provides a plurality of Breakpoint Control signals and a Bus Request signal to CPU 2. Control circuit 20 also receives a Bus Grant signal provided by CPU 2.

The plurality of control registers 40 receive a multi-bit serial information signal from register 32. The plurality of control registers 40 provide a Configuration signal having a plurality of bits to control circuit 60. Breakpoint circuit 100 receives a KADDR (K Address) signal and a KDATA signal from K-Bus 25. The plurality of hardware breakpoint registers 50 also provide an Internal Data signal having a plurality of bits to register 32. K-bus 25 is also provided to the plurality of hardware breakpoint registers 50. Note that K-Bus 25 is a collection of the KADDR signal, the KDATA signal, and a KCONTROL signal. Each of the KADDR, KDATA, and KCONTROL signals are input to breakpoint circuit 100.

Serial interface 30 receives the DSDI and DSCLK signals from a first and a second integrated circuit pin, respectively. Serial interface 30 provides the DSDO signal to a third integrated circuit pin. Serial interface 30 is coupled to register 32. Register 32 is coupled to the plurality of control registers 40 and the plurality of hardware breakpoint registers 50 to provide a multi-bit Serial Information signal.

Control circuit 60 provides a Stall signal to CPU 2. Control circuit 60 also provides a FIFO Control signal to FIFO 70 and a Mux Control signal to the plurality of multiplexers 80. FIFO 70 is coupled to K-bus 25 to receive the KADDR and KDATA signals. FIFO 70 is also coupled to the plurality of multiplexers 80 to provide a FIFO signal. FIFO 70 also provides a Full signal to control circuit 60. The plurality of multiplexers 80 receive a CPST signal from CPU 2. The plurality of multiplexers 80 provide the DDATA and PST signals.

Control circuit 20 provides the signals required to operate serial interface 30 and to control the storage of information in register 32. Once register 32 is loaded with data, control circuit 20 directs a transfer of this data into an appropriate destination in either control circuit 40 or the plurality of hardware breakpoint registers 50. The control function executed by control circuit 20 is communicated by Control bus 15. In addition to controlling execution of the load operations, control circuit 20 receives status information from control circuit 40 and breakpoint information from breakpoint circuit 100. Control circuit 20 collectively uses the status information and the breakpoint information to generate the Bus Request signal, the Breakpoint Control signals, and the Trace signal.

Figure 3:
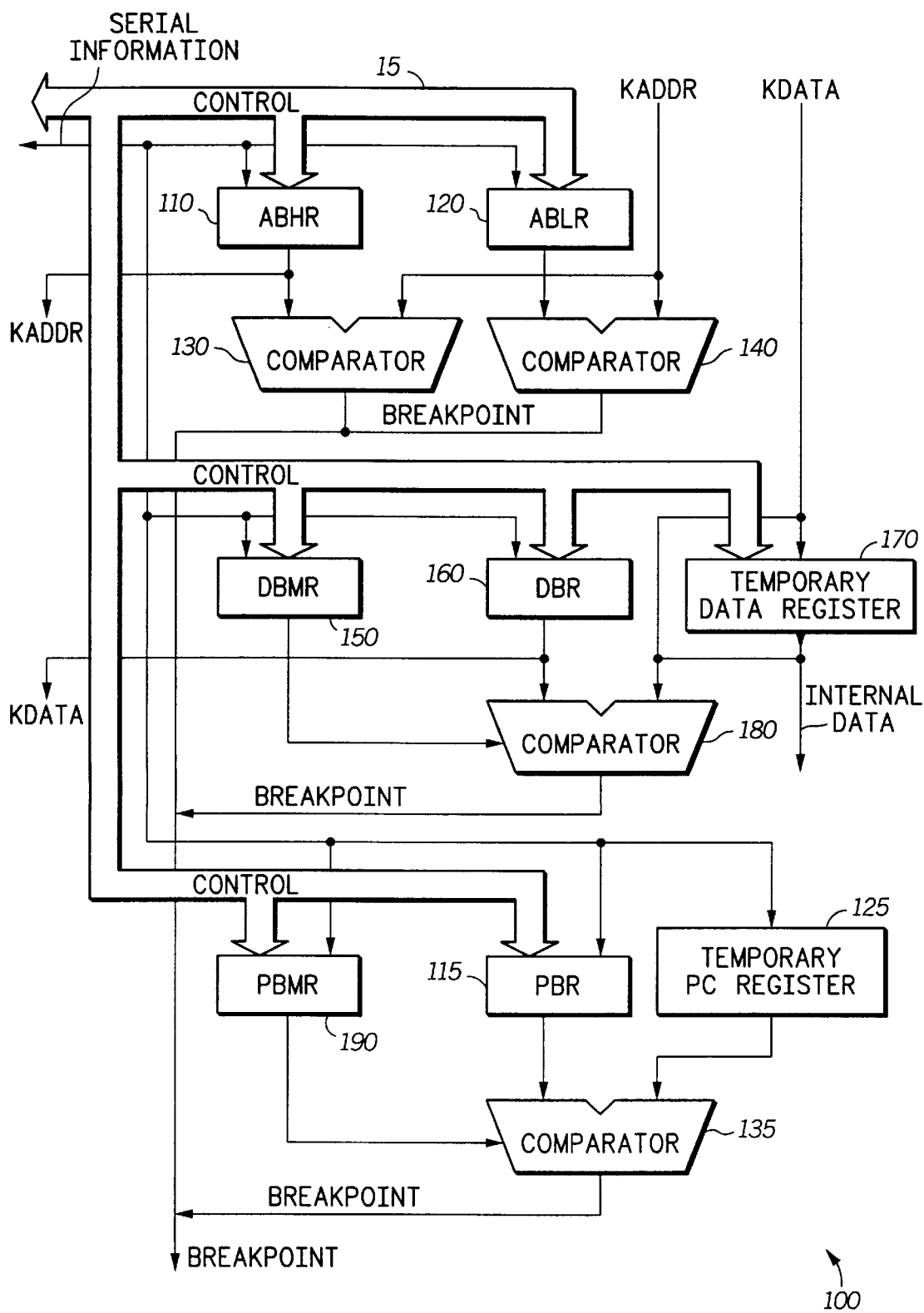
FIG. 3 illustrates, in block diagram form, a breakpoint circuit of the debug module of FIG. 2.

FIG. 3 illustrates breakpoint circuit 100 in greater detail. Breakpoint circuit 100 comprises an Address Breakpoint High Register (ABHR) 110, an Address Breakpoint Low Register (ABLR) 120, a comparator 130, a comparator 140, a Data Breakpoint Mask Register (DBMR) 150, a Data Breakpoint Register (DBR) 160, a temporary data register 170, a comparator 180, a Program Counter Breakpoint Mask Register (PBMR) 190, a Program Counter Breakpoint Register (PBR) 115, a temporary program counter (PC) register 125, and a comparator 135.

Control bus 15 is coupled to an input of each of ABHR 110, ABLR 120, DBMR 150, DBR 160, PBMR 190, and PBR 115. The Serial Information signal is coupled to an input of each of ABHR 110, ABLR 120, DBMR 150, and DBR 160. The KCONTROL signal is coupled to an input of each of PBMR 190, PBR 115, and temporary PC register 125. A first output of ABHR 110 is coupled to the KADDR signal. Control bus 15 is also coupled to temporary registers 170 and 125. The Serial Information signal is coupled to the first input of comparator 130. The KADDR signal provides a second input to comparator 130. The KADDR signal provides a second input to comparator 130. ABLR 120 provides a first input to comparator 140 and the KADDR signal provides a second input to comparator 140. An output of comparator 130 and an output of comparator 140 are both coupled to the Breakpoint signal conductor.

An output of DBMR 150 is coupled to an enable input of comparator 180. An output of DBR 160 is coupled to a first input of comparator 180. The KDATA signal is coupled to an input of temporary data register 170. An output of temporary data register 170 is coupled to a second input of comparator 180 and to the Internal Data signal. An output of comparator 180 is coupled to the Breakpoint signal conductor.

An output of PBMR 190 is coupled to an enable input of comparator 135. An output of PBR 115 is coupled to a first input of comparator 135. The KCONTROL signal is coupled to an input of temporary program counter register 125. An output of temporary PC register 135 is coupled to a second input of comparator 135. An output of comparator 135 is coupled to the Breakpoint signal conductor.

Figure 12:
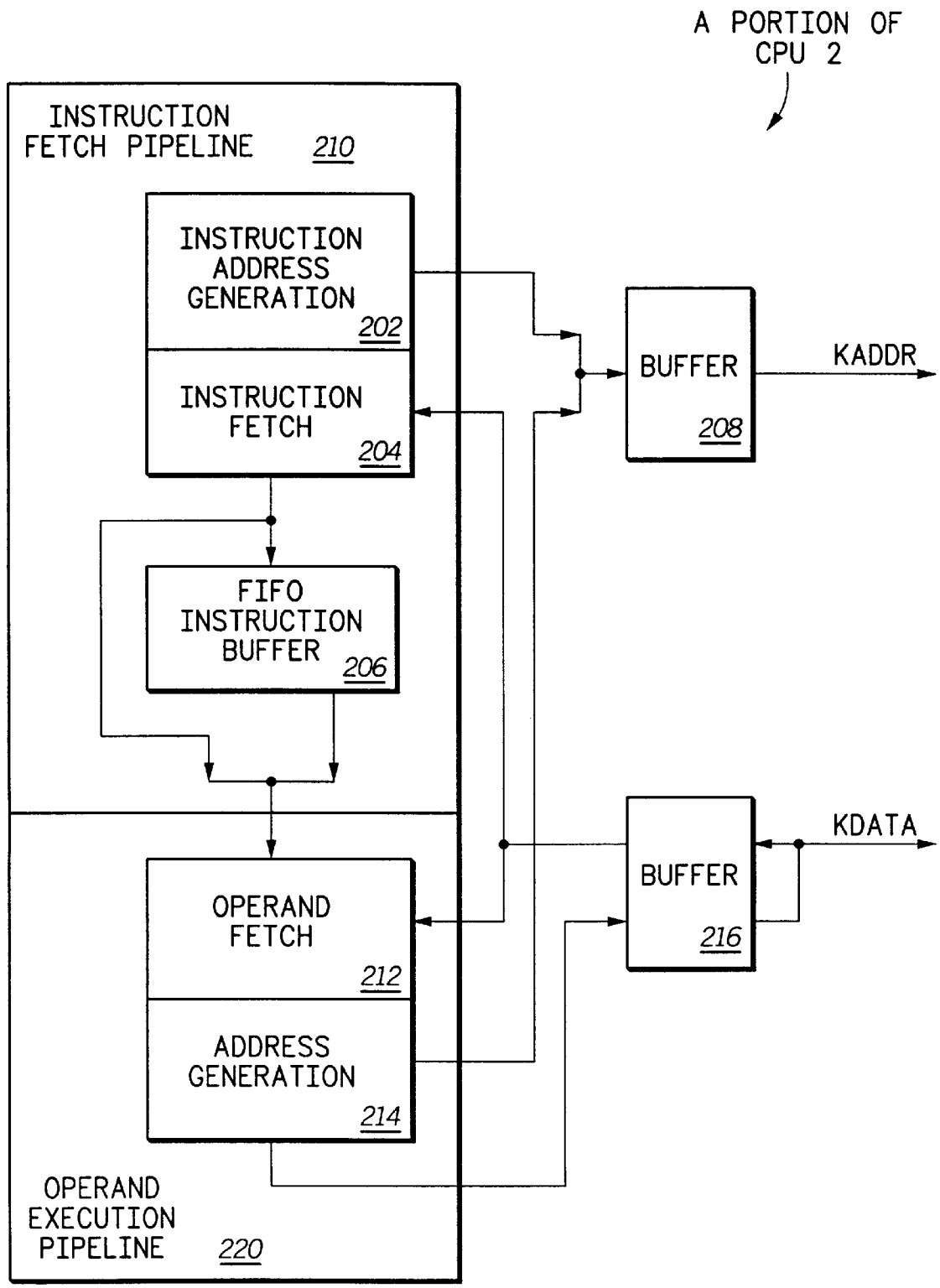
FIG. 12 illustrates, in block diagram form, a portion of a central processing unit of the data processing system of FIG. 1.

FIG. 12 illustrates a portion of central processing unit 2 in greater detail. The portion of central processing unit 2 comprises an instruction fetch pipeline (IFP) 210 and an operand execution pipeline (OEP) 220. IFP 210 comprises an instruction address generation circuit 202, an instruction fetch circuit 204, and a FIFO instruction buffer 206. OEP 220 comprises an operand fetch circuit 212, and an address generation circuit 214.

An output of instruction address generation circuit 202 is coupled to a first input of buffer 208. An output of instruction fetch circuit 204 is coupled to both FIFO instruction buffer 206 and operand fetch circuit 212. An output of FIFO instruction buffer 206 is coupled to operand fetch circuit 212. A first output of address generation circuit 214 is coupled to a second input of buffer 208. A second output of address generation circuit 214 is coupled to buffer 216.

A first output of buffer 216 is coupled to operand fetch circuit 212 and to instruction fetch circuit 204. A second output of buffer 216 provides the KDATA signal. The KDATA signal is also provided to buffer 216. An output of buffer 208 provides the KADDR signal.

Register Descriptions

Figure 4:
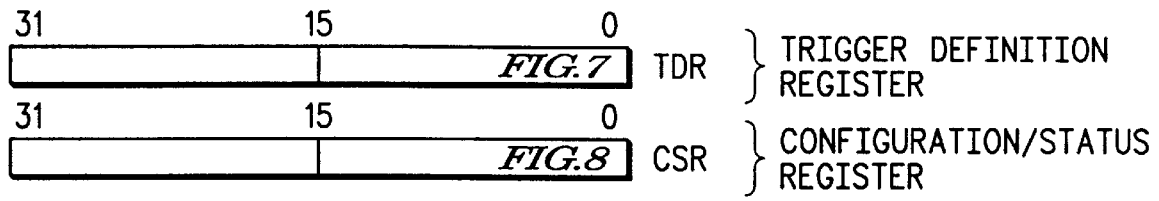
FIG. 4 illustrates, in block diagram form, a plurality of control registers of the debug module of FIG. 2.

FIG. 4 illustrates a portion of the plurality of control registers 40 in greater detail. In one embodiment of the present invention, the portion of the plurality of control registers 40 includes a Trigger Definition register (TDR) and a Configuration/Status register (CSR).

The TDR stores a configuration of debug module 10 and provides control for selected functions executed under predefined conditions. In the present embodiment of the invention, a trigger may be configured as a one or two level trigger where bits 31 through 16 define a second level trigger and bits 15 through 0 define a first level trigger. When the trigger is configured as a two level trigger, the trigger functions in a manner similar to a conditional construct. For example, if a first condition, or level, of a trigger is satisfied, then a second condition, or level, must be satisfied before the trigger enables a breakpoint function to be executed by data processing system 5. Stated another way:

If 1st condition is satisfied, then if 2nd condition is satisfied then TRIGGER.

A function of each of the bits included in the TDR will subsequently be discussed in greater detail.

A TDR is illustrated in greater detail in FIG. 7. The PCI bit of the TDR is a Program Counter Breakpoint Invert bit. If the PCI bit is asserted, a program counter breakpoint is initiated outside a range defined by the Program Counter Breakpoint (PBR) and Program Counter Breakpoint Mask (PBMR) registers. If the PCI bit is negated, a program counter breakpoint is defined within a region defined by the PBR and the PBMR.

An Enable Program Counter Breakpoint (EPC) bit selectively enables the trigger's dependence on the program counter breakpoints, PBR and PBMR, when it is asserted. When the EPC bit is negated, the program counter breakpoint is disabled.

When asserted, an Enable Address Breakpoint Low (EAL) bit enables an address stored. in the ABLR of the Address Breakpoint Registers of the plurality of hardware breakpoint registers 50 to function as a breakpoint trigger. Therefore, if the EAL bit is asserted, the breakpoint triggers when an address value transferred via the KADDR signal is the same as an address value stored in the ABLR of the Address Breakpoint Registers.

An Enable Address Breakpoint Range (EAR) bit enables a breakpoint to trigger on an inclusive range defined by the ABLR and the ABHR of the Address Breakpoint Registers of the plurality of hardware breakpoint registers 50 when the bit is asserted. Therefore, if the EAR bit is asserted, the breakpoint triggers when an address value transferred via the KADDR signal is within a range defined by the address values stored in the ABLR and ABHR of the Address Breakpoint Registers.

When asserted, an Enable Address Breakpoint Inverted (EAI) bit enables the breakpoint to trigger on an address range exclusive, or outside, of the range defined by the ABLR and the ABHR of the Address Breakpoint Registers of the plurality of hardware breakpoint registers 50. Therefore, when the EAI bit is asserted, the breakpoint triggers when an address value transferred via the KADDR signal is less than an address value stored in the ABLR of the Address Breakpoint Registers or greater than an address value stored in the ABHR of the Address Breakpoint Registers.

A Data Breakpoint Invert (DI) bit inverts a logical sense of a plurality of data breakpoint comparators when it is asserted. The DI bit may be used to develop a trigger based on an occurrence of a data value which is not equal to a data value programmed into the DBR of the plurality of hardware breakpoint registers 50.

When asserted, an Enable Data Breakpoint for the Upper Upper Data Byte (EDUU) bit enables a data breakpoint trigger based on bits thirty-one through twenty-four of a data value transferred via the KDATA signal and K-Bus 25. Similarly, when asserted, an Enable Data Breakpoint for the Upper Middle Data Byte (EDMU) bit enables a data breakpoint trigger based on bits twenty-three through sixteen of a data value transferred via the KDATA signal and K-Bus 25. As well, when asserted, an Enable Data Breakpoint for the Lower Middle Data Byte (EDLM) bit enables a data breakpoint trigger based on bits fifteen through eight of a data value transferred via the KDATA signal and K-Bus 25. Also, when asserted, an Enable Data Breakpoint for the Lower Lower Data Byte (EDLL) bit enables a data breakpoint trigger based on bits eight through zero of a data value transferred via the KDATA signal and K-Bus 25.

An Enable Data Breakpoint for the Upper Data Word (EDWU) bit enables a data breakpoint trigger based on bits thirty-one through sixteen of a data value transferred via the KDATA signal and K-Bus 25 when asserted. An Enable Data Breakpoint for the Lower Data Word (EDWL) bit enables a data breakpoint trigger based on bits fifteen through zero of a data value transferred via the KDATA signal and K-Bus 25 when asserted.

An Enable Data Breakpoint for the Data Longword (EDLW) bit enables a data breakpoint trigger based on bits thirty-one through zero of a data value transferred via the KDATA signal and K-Bus 25 when asserted. It should be noted that the assertion of any of the EDUU, EDUM, EDLM, EDLL, EDWU, EDWL, and EDLW bits enables the data breakpoint trigger. As is generally required, the given condition should occur before the data breakpoint is actually triggered. If each of the EDUU, EDUM, EDLM, EDLL, EDWU, EDWL, and EDLW bits is negated, the data breakpoint trigger is disabled in one embodiment of the present invention.

Additionally, note that in the present embodiment of the invention, data breakpoint triggers may be generated on misaligned or unaligned operand references. This generation of breakpoint triggers on misaligned or unaligned operand references uses a following methodology. For byte-size references, an appropriate set of data bits will be programmed as a function of the two low order bits of the operand address. See the following example.

If KADDR [1:01]=00, then KDATA[31:24] is programmed;

If KADDR [1:01]=01, then KDATA[23:16] is programmed;

If KADDR [1:01]=10, then KDATA[15:8] is programmed; and

If KADDR [1:01]=11, then KDATA[7:0] is programmed.

For word-size references, either bits thirty-one through sixteen or bits fifteen through zero of the data value transferred via the KDATA signal will be programmed as a function of bit one of the KADDR signal. If bit one of the KADDR signal is a logic zero value, bits thirty-one through sixteen are programmed. If bit one of the KADDR signal is a logic one value, bits fifteen through zero are programmed. For long-word references, bits thirty-one through zero of the KADDR signal are programmed.

An Enable Breakpoint Level (EBL) bit serves as a global enable for a breakpoint trigger when asserted. If the EBL bit is not asserted, all breakpoint triggers are disabled.

A Trigger Response Control (TRC) value determines a manner in which data processing system 5 responds to a completed trigger condition. The trigger response is displayed to an external user via the DDATA signal provided by a plurality of integrated circuit pints. When the TRC value has a logical value of %01, the occurrence of a hardware breakpoint condition detected by breakpoint circuit 100 enables control circuit 20 to assert the Breakpoint signal to CPU 2. The assertion of the Breakpoint signal causes CPU 2 to halt normal execution of data processing instructions at an interruptible point. When the TRC value has a logical value of %10, the occurrence of a hardware breakpoint condition enables control circuit 20 to assert a debug interrupt signal to CPU 2. When the debug interrupt signal is asserted, CPU 2 suspends normal execution at an interruptible point and executes a predetermined exception processing routine.

The Configuration Status Register (CSR) is illustrated in greater detail in FIG. 8. The CSR defines an operating configuration of CPU 2, MMU/Controller 4, memory 6, and debug module 10 of data processing system 5. In addition to defining the configuration of data processing system 5, the CSR includes status information which indicates a state of breakpoint circuit 100.

It should be noted that the CSR is cleared when data processing system is reset. Furthermore, the CSR may be read and written by an external development system (not shown herein) when data processing system is in a background debug mode of operation. The background debug mode of operation will subsequently be described in greater detail. A function of each of the bits included in the CSR will subsequently be discussed in greater detail.

As illustrated in FIG. 7, the CSR includes a Breakpoint Status (Status) field which defines and provides read-only status information about hardware breakpoint functions in data processing system 5. Information stored in the Breakpoint Status field is generated by the plurality of control registers 40 in response to breakpoint trigger information provided by breakpoint circuit 100. The information stored in the Status field is a function of the TDR in the plurality of control registers 40. When the Status field stores a logical value of $0, no hardware breakpoints are enabled. When the Status field stores a logical value of $1, debug module 10 is waiting for a level one breakpoint to be triggered. As previously discussed, attributes of the level one breakpoint are defined by bits fifteen through zero of the Trigger Definition Register (TDR). If a logical value of $2 is stored in the Status field of the CSR, the level one breakpoint has been triggered. When the Status field stores a logical value of $5, debug module 10 is waiting for a level two breakpoint to be triggered. As previously discussed, attributes of the level two breakpoint are defined by bits thirty-one through sixteen of the Trigger Definition Register (TDR). If a logical value of $6 is stored in the Status field of the CSR, the level two breakpoint has been triggered.

The breakpoint status reflected in the Status field of the CSR is provided to an external user (not illustrated in FIG. 2) via the plurality of external integrated circuit pins which provide the DDATA signal. See FIG. 9. The DDATA signals reflect the breakpoint status when the signals are not displaying data captured on K-Bus 25. Additionally, note that the contents of the CSR may be read using serial interface 30 at any time. The breakpoint status is, therefore, available via two means—the DDATA signal when the DDATA signal is not displaying captured data or through a READ CSR command using serial interface 30.

The CSR also provides a four-bit value which indicates an entry status into background debug mode to external development system 7. A first bit in the four-bit value is the FOF bit. When asserted, the Fault-on-Fault (FOF) bit indicates that a catastrophic halt of CPU 2 of data processing system 5 has occurred and data processing system 5 was forced to enter a background debug mode of operation. The background debug mode of operation will subsequently be discussed in greater detail. The FOF bit is cleared upon a read of the contents of the CSR.

When asserted, the Hardware Breakpoint Trigger (TRG) bit indicates that a hardware breakpoint has halted operation of CPU 2 of data processing system 5. When asserted, the TRG bit indicates that data processing system 5 was forced to enter the background debug mode of operation. The TRG bit is cleared upon a read of the contents of the CSR or a receipt of a "Go" command serially provided through serial interface 30.

The Processor Halt (Halt) bit indicates that CPU 2 executed an instruction specifying that CPU 2 should halt when it is asserted. When asserted, the Halt bit indicates that data processing system 5 was forced to enter the background debug mode of operation. The Halt bit is cleared upon a read of the contents of the CSR or a receipt of a "Go" command serially provided through serial interface 30.

The $\overline{\text{BKPT}}$ Assert (BKPT) bit indicates that the $\overline{\text{BKPT}}$ signal was asserted and provided to CPU 2. When asserted, the BKPT bit indicates that data processing system 5 was forced to enter the background debug mode of operation. The BKPT bit is cleared upon a read of the contents of the CSR or a receipt of a "Go" command serially provided through serial interface 30.

When asserted, an Inhibit Processor Writes to Debug Registers (IPW) bit inhibits write operations to the plurality of hardware breakpoint registers 50 and to the plurality of control registers 40. The IPW bit may only be modified by commands provided from an external development system such as external development system 7. The IPW bit effectively locks out CPU 2 from overwriting debug information written to the plurality of control registers 40 and the plurality of breakpoint registers 50 by external development system 7.

When asserted, a Force Processor References in Emulator Mode (MAP) bit forces CPU 2 to map all references to a special address space when data processing system is operating in an emulator mode. If the MAP bit is negated, all emulator-mode references are mapped into supervisor text and data spaces in memory 6.

The present invention includes an emulator mode as a special operating mode that is a logical extension of a supervisor, or privileged, mode. This special mode of operation is entered upon the assertion of one of three possible indicators in the present embodiment of the invention. Once in emulator mode, all normal input/output interrupts may be ignored and data processor 3 may optionally force all memory references into an "alternate space." The MAP bit controls this operation of data processor 3. The emulator mode of operation is typically used to allow external development system 7 to intercept all memory references to this alternate space and to provide the instruction and data values required to support some type of debug function. The alternate space remapping is provided to allow external development system 7 to gain control of the operation of data processor 3 without changing a state or "normal" system memory. In the present embodiment of the invention, data processor 3 remains in emulator mode until a special instruction, such as RTE (Return from Exception) is executed. At that time, data processor 3 exits emulator mode and CPU 2 returns to a normal operating mode.

It should be noted that in the present embodiment of the invention, emulator mode entry and exit are signaled to the external user via the PST signal. A value of $D on the PST signal indicates entry into emulator mode and a value of $7 on the PST signal indicates exit from emulator mode. The indication of entry into and exit from an emulator mode of operation provided by the PST signal is especially significant as it provides an indication to external development system 7 that a hardware breakpoint has been triggered. Therefore, the serial port provided via serial interface 30 may be used to retrieve debug information from external memory locations.

If the MAP bit is negated, then all emulator mode memory references are mapped into supervisor accesses as normal so that the system resources such as on-chip memory, external memory, and input/output devices may be referenced.

Additionally, in the present embodiment of the invention, three methods have been implemented for entering into an emulator mode of operation. In a first method, if a Force Emulation Mode on Trace Exception (TRC) bit is asserted, then the occurrence of a software trace exception forces data processor 3 to enter into an emulator mode of operation. This is a mechanism to create a single instruction debugger routine which is controlled by external development system 7 and not by a software debugger running on data processor 3.

In a second method, if a Force Emulation Mode (EMU) bit is asserted, data processor 3 begins reset exception processor. Again, this method allows external development system 7 to control data processing system 10 before it begins instruction processing.

The third method enables data processor 3 to enter into emulator mode when a debug interrupt is asserted in response to a triggered hardware breakpoint. The TRC field of the TDR may be used to program the use of a hardware breakpoint trigger to generate a debug interrupt with an entry into emulator mode.

A Debug Data Control (DDC) value provides configuration control information for capturing operand data to be provided to the external development system via the DDATA signal. When the DDC value is %00, no operand data is displayed on the DDATA signal. When the DDC value is %01, all write data communicated via M-Bus 23 is captured and displayed on the DDATA signal. When the DDC value is %10, all read data communicated via M-Bus 23 is captured and displayed on the DDATA signal. When the DDC value is %11, all read and write data communicated via M-Bus 23 is captured and displayed on the DDATA signal. Independent of a type of information specified by the DDC value, the DDATA signal displays a number of bytes defined by an operand reference size. When an operand is captured under control of the DDC field of the CSR, a number of bytes displayed on the DDATA signal is determined by a type of reference being executed. If the operand was referenced as a byte, eight bits of data are displayed. If the operand was referenced as a word, sixteen bits of data are displayed. Similarly, if the operand was referenced as a long-word, thirty-two bits of data are displayed. The DDC provides the ability to capture M-bus 23 read and write operations. However, the operand reference size determines a number of bytes actually displayed on the DDATA signal.

A Branch Target Bytes (BTB) value defines a number of bytes of a branch target address are to be displayed on the DDATA signal. When the BTB value is %00, no bytes of the branch target address are displayed on the DDATA signal. When the BTB value is %01, a lower two bytes of the branch target address are displayed on the DDATA signal. When the BTB value is %10, a lower three bytes of the branch target address are displayed on the DDATA signal. When the BTB value is %11, an entire four bytes of the branch target address are displayed on the DDATA signal. It should be noted that the DDATA signal generally outputs data in a least-significant to a most-significant order. This is true for captured operands as well as branch target addresses. Furthermore, during operation, FIFO storage buffer 70, under control of control circuit 60, only captures only those target addresses associated with taken branch operations that use a variant addressing mode. The variant addressing mode is an addressing mode in which an address is not provided by a program-counter relative, or absolute address, but is calculated by some other means. Such target addresses are typically associated with exception vectors as well as return-from-exception (RTE), return-from-subroutine (RTS) instructions and some forms of jump (JMP) and jump-to-subroutine (JSR).

An Enable Debug Mode (END) bit disables a normal operation of the PST and DDATA signals if asserted. Furthermore, when this bit is enabled, CPU 2 of data processor 3 outputs an eight-bit vector of internal state information.

When asserted, a Non-Pipelined Mode (NPL) bit forces CPU 2 to operate in a non-pipeline mode of operation. When in the non-pipeline mode of operation, data processing system 3 effectively executes a single instruction at a time with no overlap between two or more successive instructions.

When asserted, an Ignore Pending Interrupts (IPI) bit forces CPU 2 to ignore any pending interrupt requests when data processing system 5 is operating in a single-instruction-step mode.

A Single-Step Mode (SSM) bit forces CPU 2 to operate in a single-instruction-step-mode when it is asserted. While in the single-instruction-step-mode, CPU 2 executes a single instruction and then halts. While CPU 2 is halted, any command associated with background debug mode may be executed. Upon receipt of a GO command, CPU 2 executes a next instruction and then halts again. This process continues until the single-instruction-step mode is disabled.

A Store Buffer Disable (SBD) bit, a K-Bus RAM Disable (KAD) bit, K-Bus ROM Disable (KOD) bit, and a K-Bus Cache Disable (KCD) bit are collectively used to allow external development system 7 to override normal configurations of data processor 3 for debug purposes. Specifically, the SBD bit disables the use of an optional FIFO storage buffer which is located in MMU/controller 4 and should not be confused with FIFO storage buffer 70. The KAD bit allows the use of memory block 6 to be bypassed and to force M-Bus 23 accesses. Memory block 6 may include RAM modules, ROM modules, and/or cache modules. The KAD, KOD, and KCD bits are respectively used to disable the functions provided by each of these modules.

Figure 5:
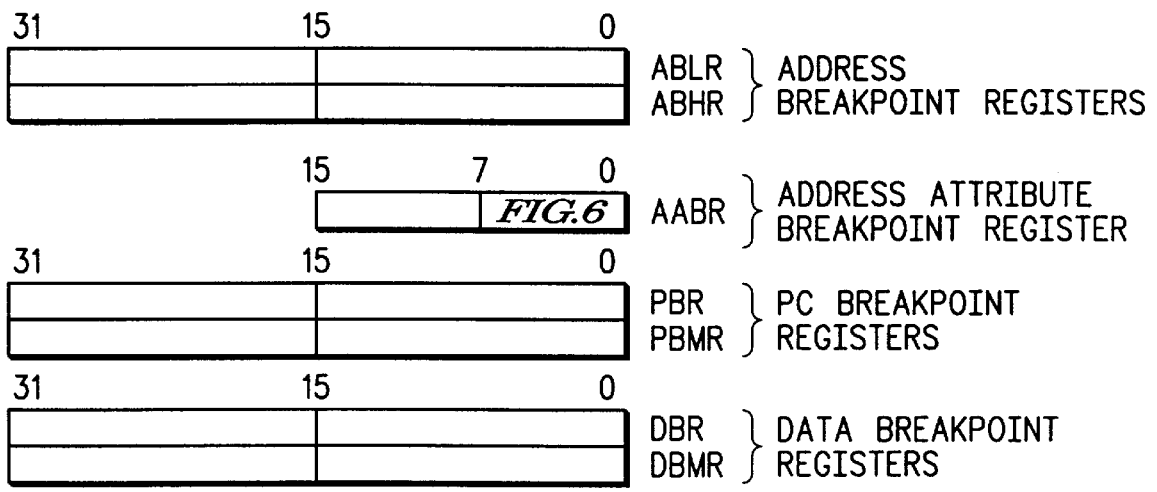
FIG. 5 illustrates, in block diagram form, a plurality of hardware breakpoint registers of FIG. 2.

The plurality of hardware breakpoint registers 50 are illustrated in greater detail in FIG. 5. A general description of the function of each of the plurality of hardware breakpoint registers 50 will be provided herein. A more detailed description of the function of each of the plurality of hardware breakpoint registers 50 will subsequently be described in greater detail.

In FIG. 5, the Address Breakpoint registers (ABLR and ABHR) define a region in an operand logical address space of data processing system 5 which may be used to trigger a breakpoint function. The address values stored in each of ABLR and ABHR are compared with address values transferred via K-Bus 25. Additionally, note that in a following discussion a set of conditions which must be met to execute the breakpoint function are referred to as a trigger.

The Address Attribute Breakpoint Register (AABR) is illustrated in greater detail in FIG. 6. The Address Attribute Breakpoint Register defines a plurality of address attributes and a mask to be matched in the trigger for the breakpoint function. Like the ABLR and ABLR address values, an attribute value stored in the AABR is compared with an address attribute signal transferred via K-Bus 25.

A lower five bits of the AABR, a Transfer Type (TT) value and a Transfer Modifier (TM) value, collectively define an address space used when data processing system 5 executes a memory reference while in a background debug mode. The IT value indicates whether the transfer is a supervisor operand, a supervisor instruction, a user operand, or a user instruction.

Note that each of the plurality of hardware breakpoint registers 50 serve two functions. When data processor 3 is operating in a background debug mode of operation, the plurality of hardware breakpoint registers 50 are used during execution of memory and processor referencing operations. When data processor 3 is not operating in the background debug mode of operation, the plurality of hardware breakpoint registers 50 are used to detect hardware breakpoints.

When the plurality of hardware breakpoint registers 50 are used to detect hardware breakpoints, the AABR registers includes four fields plus four equivalent mask fields. The TT and TM fields define an address space being accessed. Table 1 illustrates an encoding for each of the fields.

TABLE 1

| TT | TM  | Address Space                        |
|----|-----|--------------------------------------|
| 00 | 001 | User Operand                         |
| 00 | 010 | User Instruction                     |
| 00 | 101 | Supervisor Operand                   |
| 00 | 110 | Supervisor Instruction               |
| 01 | xxx | Unused                               |
| 10 | 101 | Emulator Mode Operand (if MAP=1)     |
| 10 | 110 | Emulator Mode Instruction (if MAP=1) |
| 11 | 000 | CPU-space                            |
| 11 | 001 | Interrupt Acknowledge                |
| 11 | 0lx | Interrupt Acknowledge                |
| 11 | 1xx | Interrupt Acknowledge                |

Note that "address space" is often defined by an operating level of privilege (user mode or supervisor mode) and the type of reference (operand, instruction fetch) being performed. Together, the TT and TM values may be used to more precisely define a breakpoint location.

A next value in the AABR, a Size (SZ) value, indicates that in addition to an address range, a size attribute transferred via K-Bus 25 must correspond to a value stored in the SZ bits of the AABR. Similarly, a Read/Write (R) value is stored in the AABR. The R value indicates that a trigger condition based on a read or write operation is to be applied in comparisons based on address.

The aforementioned bits are used when the plurality of hardware breakpoint registers 50 are operating as a breakpoint monitor. These bits are compared with K-Bus 25 attribute information. As an example, it is possible to program the plurality of breakpoint registers 50 such that only a user-mode, word-size operand read is triggered. Therefore, these bits of the AABR may be used to provide additional qualifications for the address breakpoint definition.

Additionally, AABR includes attribute mask bits which provide the ability to mask out each individual bit from a breakpoint definition.

A most significant bit of the AABR, a Read/Write Mask (RM) bit, indicates that a trigger condition based on a read or write operation is to be ignored in comparisons based on address. Therefore, if the RM bit is asserted, the R bit is ignored during comparison operations. A next set of bits, a Size mask (SM) value, indicates that a trigger condition based on a size of an address is to be ignored in comparisons based on address. For example, if a bit in the SM value is asserted, a corresponding bit in the SZ value is ignored in an address comparison function.

A Transfer Type Mask (TTM) value corresponds to the TT value. When a bit in the TTM value is asserted, a corresponding bit in the TT value is ignored in subsequent address comparisons. Similarly, a Transfer Modifier Mask (TMM) value corresponds to the TM value. When a bit in the TMM field is asserted, a corresponding bit in the TM value is ignored in subsequent address comparisons.

The plurality of hardware breakpoint registers 50 also include a plurality of Program Counter Breakpoint registers. The plurality of Program Counter breakpoint registers define a region in an instruction logical address space of data processing system 5 which may be used to trigger a breakpoint function. The Program Counter Breakpoint (PBR) value may be masked by a value stored in the Program Counter Breakpoint Mask (PBMR) register. In one embodiment of the invention, only those bits in the PBR which have a corresponding zero value stored in the PBMR are used in a comparison operation with a program counter value of data processing system 5. Note that the program counter value is stored in a program counter register (not illustrated herein) of CPU 2 of data processing system 5.

In addition to the Program Counter Breakpoint registers, the plurality of hardware breakpoint registers 50 include a plurality of Data Breakpoint Registers. The plurality of Data Breakpoint Registers include a Data Breakpoint Register (DBR) and a Data Breakpoint Mask Register (DBMR). The DBR stores a data value which defines a specific data pattern which may be used to form a trigger when data processing system 5 is performing a debug operation. A data mask value stored in the DBMR masks the data value stored in the DBR. Thus, in one embodiment of the present invention, only those bits stored in the DBR which have a corresponding zero value stored in the DBMR may be compared with data signals transferred via K-Bus 25 to determine if a trigger condition is met.

Description of Operation

For purposes of the subsequent discussion, the general topic of debug support may be partitioned into three separate areas which have unique requirements and unique functionality. The present invention provides real time trace support, a background debug mode of operation, and real-time debug support. Data processing system 5 of FIG. 1 illustrates one embodiment of the present invention.

In data processing system 5, data processor 3 is connected to external development system 7 to communicate information. Then, external development system 7 uses the communicated information to perform debug operations designed to identify and isolate faulty circuitry and erroneous software code in data processor 3. External development system 7 communicates with data processor 3 via the DSDI, DSCLK, DSDO, DDATA, PST, and other Input/Output signals. The DSDI, DSCLK, and DSDO signal provide a serial communication means between external development system 7 and data processor 3. The DDATA signal provides debug information from data processor 3 to external development system 7. Depending on a configuration of the CSR, debug module 10 may capture certain operand and branch target addresses for display on the DDATA signal. Additionally, CPU 2 may execute instructions which are captured and displayed on the DDATA signal regardless of a configuration value stored in the CSR. The PST signal provides internal processor status to external development system 7. Therefore, during execution of a program operation, the DDATA and PST signals may be collectively accessed to reflect a current operation executed by data processor 3.

During operation, core 9 uses K-Bus 25 to connect CPU 2, MMU/Controller 4, and memory 6. In the present embodiment of the invention, K-Bus 25 is a high speed, single-cycle access bus. Memory 6 may include random access memory (RAM), read only memory (ROM), cache blocks, and any combination thereof. All other system modules and peripherals are coupled to core 9 via M-Bus 23. M-Bus 23 is an internal multi-master bus which is used to perform data transfers initiated by one of multiple bus masters. System bus controller 8 provides multiple functions. System Bus controller 8 provides an interface between internal M-Bus 23 and the external E-Bus, if the external E-Bus exists. Additionally, system bus controller 8 serves as a focal point for controlling all data transfers on the S-bus. The S-Bus is used to connect simple slave peripheral modules (12 and 13) such as timers and serial communication channels into data processing system 5.

In the present invention, data processor 3 has several layers of bus bandwidth to provide a cost-effective mechanism for data transfers. Core 9 is interconnected with a high-speed, single cycle K-Bus 25 to maximize performance. For transfers not directly coupled to this high-speed bus, M-Bus 23 provides bandwidth from any of the internal bus masters such as core 9 and master module 14. System bus controller 8 provides a connection between the internal M-Bus 23 and the external E-Bus (if present), while also providing a control function for all data transfers on the low-cost, lower bandwidth S-Bus for slave peripheral modules such as slave modules 12 and 13. Debug module 10 is connected to K-Bus 25 to allow non-intrusive observation of all processor-initiated memory accesses. Debug module 10 also provides the connections to external development system 7.

Debug module 10 of FIG. 1 provides logic circuitry for supporting each of the three previously described debug operations. Operation of debug module 10 will subsequently be discussed in greater detail.

Real Time Trace Function

The present invention provides an important, and hereto non-existent, real time trace function. The real time trace function allows an external user, such as external development system 7, to dynamically observe internal operations of data processor 3. Furthermore, the real time trace function provides such observability into the internal operation of the system without significantly impacting the efficiency and speed of data processing system 5. Debug module 10 of data processing system 5 provides a parallel output port for providing the internal operating information via the DDATA and PST signals to the external user. The DDATA signal provides data which reflects operand data and the PST signals provide encoded status information which reflects an execution status of CPU 2. Furthermore, the DDATA signal also provides captured instruction address program flow changes to allow an external development system to trace an exact program flow without requiring an externally visible address bus or an externally visible data bus. Note that the information displayed on the DDATA signal is synchronized with the status information on the PST signals. Therefore, an external user is able to decode the DDATA and PST signals to determine a dynamic execution path of the program without suspending operation of data processor 3, nor requiring a special debug mode of operation to make this execution path visible.

Operation of data processing system 5 during execution of a real time trace will subsequently be discussed in greater detail. Prior to that discussion, the encodings of the PST signal will be briefly described. A table illustrating the encoding of the PST signal is provided in FIG. 10.

FIG. 10 illustrates a relationship between a value provided via bits three through zero of the PST signal and a status of CPU 2. When the PST signal provides a value of %0000, a previous operation has not yet been completed and execution simply continues. If a value of %0001 is provided the PST signal indicates that execution of an instruction is beginning. When the PST signal has a value of %0011, data processing system is entering into a user mode of operation. If a value of %0100 is provided by the PST signal, data processing system 5 is beginning execution of a Pulse or a WDDATA instruction. The Pulse opcode simply generates this special PST encoding, while the WDDATA opcode forces an operand to be captured and displayed on DDATA regardless of the configuration defined by the CSR. This provides a simple mechanism to display memory operands, exception stack frames, or software markers directly on the DDATA signal.

If a value of %0101 is provided by the PST signal, data processing system 5 is beginning execution of a taken Branch operation. If a value of %0111 is provided by the PST signal, data processing system 5 is beginning execution of a RTE instruction. When the PST signal provides a value of %1000, data processing system 5 is beginning a one byte transfer on the DDATA signal. When the PST signal provides a value of %1001, data processing system 5 is beginning a two byte transfer on the DDATA signal. When the PST signal provides a value of %1010, data processing system 5 is beginning a three byte transfer on the DDATA signal. When the PST signal provides a value of %1011, data processing system 5 is beginning a fourth byte transfer on the DDATA signal. If the PST signal has a logical value of %1100, CPU 2 of data processing system 5 is executing an exception processing routine. Similarly, if the PST signal has a logical value of %1101, CPU 2 of data processing system 5 is processing an exception. This value is asserted on the PST signal from a time the exception is detected until a first instruction of the exception processing routine is fetched. Similarly, if the PST signal has a logical value of %1101, CPU 2 of data processing system 5 is processing an exception routine which causes entry into an emulator mode of operation. When the PST signal is %1110, CPU 2 of data processing system 5 is stopped and is waiting for an interrupt. When the PST signal is %1111, CPU 2 of data processing system 5 is halted.

As was previously stated, the processor status information collectively provided by the encoded PST and DDATA signals may be used with an external program model to completely track a dynamic execution path of data processing system 5.

To enable a real time trace function, the DDATA signal must be configured to display branch target instruction addresses. Typically, this configuration is performed before data processing system 5 begins its normal execution. To configure the DDATA signal, external development system 7 may write a value to the CSR register in the plurality of control registers 40. The CSR register is illustrated in FIG. 8. To perform this write function, external development system 7 shifts in a command to load data into the CSR to serial interface 30 using both the DSDI and DSCLK signals. In one embodiment of the present invention, a first portion of the command is provided by the DSDI signal and clocked in by the DSCLK signal. Additional portions of the commands are subsequently provided. All portions of the command are stored in register 32 until a sixteen bit packet of information is complete. Note that alternate embodiments of the present invention may include more or less bits than the sixteen bits required in the present embodiment of the invention.

In the embodiment of the invention described herein, an instruction which writes a value to the CSR is forty-eight bits long with a sixteen bit opcode and thirty-two bits of data. Register 32 is only sixteen bits wide. Therefore, when a first sixteen bit packet of information is complete, the information is transferred to control circuit 20 where it is decoded and subsequent operations are configured. When a second sixteen bit packet of information has been loaded into register 32, the information is transferred to the plurality of control registers 40 via the Serial Information signal. Using control information provided by Control bus 15 from control circuit 20, the contents of the Serial Information signal are loaded into the upper portion of a destination register, the CSR. In a similar manner, a third sixteen bit packet of information is loaded into register 32 and then transferred to the plurality of control registers 40. Again, using signals sourced by control circuit 20, the contents of the Serial Information signal are loaded into the lower portion of the CSR. In this manner, the entire forty-eight bit instruction is serially shifted into debug module 10, where it is decoded and the operand value is loaded into the CSR.

The subsequent data is serially provided by external development system 7 via the DSDI signal. As previously described, the subsequent data provided by the DSDI signal is clocked in via the DSCLK signal. Each of the data bits is stored in register 32 until a sixteen bit packet of information is complete. When a second sixteen bit packet of information is complete, the information is transferred to the plurality of control registers 40 via the Serial Information signal. The second sixteen bit packet of information is stored in the CSR as bits thirty-one to sixteen. Subsequently, additional information is serially provided by external development system 7 to register 32 via the DSDI and DSCLK signals. When a third sixteen bit packet of information is complete, the information is transferred to the plurality of control registers 40 via the Serial Information signal. The third sixteen bit packet of information is stored in the CSR as bits fifteen to zero.

In the previous paragraphs, configuration of the DDATA signals was determined by a value written into the CSR by external development system 7. In another embodiment of the invention, the DDATA signals may be configured by a value written into the CSR by CPU 2 of data processor 4. When CPU 2 writes the value into the CSR, the value is provided to temporary register 170 of breakpoint circuit 100 illustrated in FIG. 6. The value is provided to temporary register 170 via the KDATA signal of K-Bus 25. From temporary register 170, the value is transferred and stored in register 32 in sixteen bit packets. For a CPU write to the CSR, the operand value transferred via the KDATA signal is captured in temporary data register 170 using control signals provided to control circuit 20 via K-Bus 25 from CPU 2. Therefore, to the plurality of control registers 40, the values appear to be the same as those provided to register 32 from external development system 7.

Whether the operand is provided by external development system 7 or CPU 2, the operand and associated operands must be stored in the CSR to configure the DDATA signals to perform a real time trace function. In the CSR, the Debug Data Control (DDC) and the Branch Target Bytes (BTB) values must be written to correctly configure the DDATA signals to provide trace information to external development system 7. As previously mentioned, the Debug Data Control (DDC) value provides configuration control information for capturing operand data to be provided to the external development system via the DDATA signal. When the DDC value is %00, no operand data is displayed on the DDATA signal. When the DDC value is %01, all write data communicated via M-Bus 23 is captured and displayed on the DDATA signal. When the DDC value is %10, all read data communicated via M-Bus 23 is captured and displayed on the DDATA signal. When the DDC value is %11, all read and write data communicated via M-Bus 23 is captured and displayed on the DDATA signal. Independent of a type of information specified by the DDC value, the DDATA signal displays a number of bytes defined by an operand reference size. For example, byte displays are eight bits long, word displays are sixteen bits long, and long displays are thirty-two bits long. When an operand is captured under control of the DDC field of the CSR, a number of bytes displayed on the DDATA signal is determined by a type of reference being executed. If the operand was referenced as a byte, eight bits of data are displayed. If the operand was referenced as a word, sixteen bits of data are displayed. Similarly, if the operand was referenced as a long-word, thirty-two bits of data are displayed. The DDC provides the ability to capture M-bus 23 read and write operations. However, the operand reference size determines a number of bytes actually displayed on the DDATA signal.

The Branch Target Bytes (BTB) value defines a number of bytes of a branch target address are to be displayed on the DDATA signal. When the BTB value is %00, no bytes of the branch target address are displayed on the DDATA signal. When the BTB value is %01, a lower two bytes of the branch target address are displayed on the DDATA signal. When the BTB value is %10, a lower three bytes of the branch target address are displayed on the DDATA signal. When the BTB value is %11, an entire four bytes of the branch target address are displayed on the DDATA signal. It should be noted that DDATA signal generally outputs data in a least-significant to a most-significant order. This is true for captured operands as well as branch target addresses. Furthermore, during operation, FIFO storage buffer 70, under control of control circuit 60, only captures only those target addresses associated with taken branch operations that use a variant addressing mode. The variant addressing mode is an addressing mode in which an address is not provided by a program-counter relative, or absolute address, but is calculated by some other means. Such target addresses are typically associated with exception vectors as well as return-from-exception (RTE), return-from-subroutine (RTS) instructions and some forms of jump (JMP) and jump-to-subroutine (JSR).

After the CSR has been written to configure the DDATA signal to provide information required to perform a real time trace function, CPU 2 provides a plurality of target addresses to FIFO (First-In First-Out) storage buffer 70 via the KADDR signal communicated by K-Bus 25. Additionally, CPU 2 provides a plurality of operand data values to FIFO storage buffer 70 via the KDATA signal communicated by K-Bus 25. The plurality of target addresses and the plurality of operand data values are stored in FIFO storage buffer 70 in response to the FIFO control signal provided by control circuit 60.

Control circuit 60 outputs the FIFO control signal in response to the Trace signal provided by control circuit 20 and the Configuration signal provided by the CSR of the plurality of control registers 40. FIFO storage buffer 70 outputs the KADDR and KDATA information stored therein in a first-in, first-out order. Because FIFO storage buffer 70 has a plurality of locations for storing address and operand information, FIFO storage buffer 70 is able to receive the KADDR and KDATA signals as each communicates information reflecting the values of operands and instruction addresses accessed during normal operation of data processor 3. Stated another way, the values transferred via the KADDR and KDATA signals provided to and stored in FIFO storage buffer 70 reflect a current operation of data processing system 5 in real time.

FIFO storage buffer 70 only affects a speed of operation of CPU 2 when all storage locations in FIFO storage buffer 70 contain valid information which must be output on the DDATA signal. When all storage locations are full, FIFO storage buffer 70 asserts the Pull signal. When the Full signal is asserted, control circuit 60 asserts the Stall signal. The Stall signal is provided to CPU 2 to stall operation of core 9 until at least one storage location in FIFO storage buffer 70 becomes available to store a next value. In all other operations, the provision of the address and operand information on the DDATA signal does not significantly impact execution speed of data processor 3.

FIFO storage buffer 70 provides the address and operand information to the plurality of multiplexers 80 via the FIFO signal. CPU 2 also provides the CPU Processor Status (CPST) signal to the plurality of multiplexers 80. The CPST signal provides processor status information to indicate a type of operation currently being executed by data processor 3. For example, the CPST signal may indicate when execution of an instruction begins, when execution of an instruction should continue, when data processor 3 enters into a selected mode of operation, when a preselected branch instruction is executed, and when operation of data processor 3 is halted. Note that the CPST signal may indicate any form of processor operation and is not limited to the examples listed herein.

When the FIFO and CPST signals are provided to the plurality of multiplexers 80, outputs of the plurality of multiplexers are controlled by the Mux Control signal. The Mux Control signal enables the plurality of multiplexers 80 to synchronously provide the DDATA and PST signals. Note that the DDATA and PST signals are synchronous with a rising edge of a clock of data processor 3 (not shown herein) and, therefore, the status provided via the PST signals may not be related to a transaction of any given bus cycle.

Furthermore, when enabled by the Mux Control signal, the PST signals provide a marker which indicates a status of a CPU 2. For example, when a status value of $C, $D, $E, or $F is provided by the PST signal, the PST signal indicates that a multi-cycle mode or a special operation is being executed by data processor 3. Refer to FIG. 10 for more information about the encoded PST signal. When the PST signal reflects that the multi-cycle mode of the special operation is being executed by data processor 3, the PST signal retains these status values until the mode is exited or the operation is complete.

When the PST signal outputs a status value of $0 to $7, the PST signal specifies information which is updated on each timing cycle.

When the PST signal provides a status value of $8, $9, $A, or $B, the PST signal is being used to qualify the values provided externally via the DDATA signal. In this operation, the PST signal is used as a "marker" to indicate which values on the DDATA signal are providing required address and data information. The PST signal is encoded with these status values one timing cycle before the actual data is displayed on the DDATA signal. Therefore, external development system will correctly observe operation of data processor 3.

A following example will illustrate the use of the DDATA and PST signals in a real time trace operation in greater detail. The example is illustrated in FIG. 11. FIG. 11 illustrates an execution of an indirect jump (JMP) instruction wherein a lower sixteen bits of a target address of the jump instruction are displayed on the DDATA signal. When a jump instruction is executed, program execution continues at an effective address specified by an operand of the instruction. In the present example, the effective address value is located at a memory location specified by register A0.

In the following example, assume that the CSR has been written to correctly configure the DDATA signal to provide data in the proper format. In the example illustrated in FIG. 11, a JMP (A0) instruction follows the previous instruction, called "Last" in FIG. 11. Note that the JMP instruction indirectly addresses the target instruction address. For example, the contents of register A0 stored in CPU 2 define a desired target instruction address. Furthermore, while not illustrated in detail in the present patent application, the A0 register may be located in CPU 2. The use of such indirect addressing is referred to as variant addressing because the target instruction address is dependent on the contents of the A0 register and is not a PC-relative nor an absolute address.

During execution of the following example, the DSOC and AGEX indicate a position in an internal pipeline of data processor 3. To explain the terms DSOC, AGEX, IAG, and IC, a brief explanation about the internal structure of CPU 2 must be provided.

In CPU 2 of data processor 3, two independent and decoupled pipelines are implemented. A first pipeline is an instruction fetch pipeline (IFP) (not shown herein) for prefetching an instruction and a second pipeline is an operand execution pipeline (OEP) for decoding and performing the actual execution of the instruction. A FIFO instruction buffer (not illustrated herein) serves as a decoupling mechanism between the two pipelines.

The instruction fetch pipeline includes two stages. A first stage is an Instruction Address Generation (IAG) stage where a next prefetch address is calculated. A second state is an Instruction fetch Cycle where the desired instructions are fetched from memory. The operand execution pipeline also includes two stages, where each stage can be used for two functions during the execution of a single instruction. A first stage is a Decode & Select (DS) state with an Operand fetch Cycle (OC). A second stage is an Address Generation (AG) stage with an EXecute (EX) stage.

For an instruction in which information is communicated between two registers, the two OEP stages are each accessed once. The register operands are accessed during an OC stage and then the instruction execution is actually performed in the EX stage. Therefore, the OEP operations progress from OC to EX.

For an instruction in which information is communicated between a memory location and a register, each pipeline stage is accessed twice. First, the components for an operand address are selected in a DS stage. Secondly, each of these components are summed to form an operand address in an AG stage. Third, the memory operand is accessed along with any other register operands in an OC stage and, fourth, the actual instruction execution is performed in the EX stage. For this type of instruction, the OEP operations are DS to AG to OC to EX.

For other types of instructions, both operations within each pipeline state are performed concurrently. For these types of instructions, the OEP operations are DS OC to AG EX.

In this example, the contents of the register A0 are assumed to define and instruction address of "Target." As the JMP instruction occupies the AGEX stage of the operand execution pipeline, the instruction target address is calculated as "Target." This change-of-flow operation causes the instruction fetch pipeline to discard its current stream of prefetch addresses and define a new stream beginning at the address "Target." In this embodiment of the invention, this change-of-flow JMP instruction causes the two pipelines to become coupled at the AGEX and IAG stages to cause the new instruction stream to be established. Once the change-of-flow has occurred, the two pipelines return to their normal, decoupled mode of operation with the instruction fetch pipeline continuing to prefetch sequentially at the new address stream. Therefore, the addresses of Target, Target+4, and Target+8 will be subsequently fetched.

As the JMP instruction completes its operand execution pipeline staging, CPU 2 signals a "taken branch" value on the internal CPST signal. Thus, the internal CPST signal has a value of $5. In this embodiment of the invention, the actual PST and DDATA signals are delayed from their internal counterparts by one timing cycle. As CPU 2 prefetches instructions at the new address, FIFO storage buffer 70 captures the instruction address Target at the conclusion of the IC cycle of the instruction fetch pipeline. On the next timing cycle, the plurality of multiplexers 80 insert a "marker" into the PST signal indicating two bytes of information are to be displayed on the DDATA signal. Therefore, the PST signal has a value of $9. Operation of the plurality of multiplexers 80 is controlled by control circuit 60. Following the appearance of the marker on the PST signal, the plurality of multiplexers 80 proceed to display the low-order sixteen bits of the captured instruction address Target beginning with a least-significant nibble, bits three through zero up to bits fifteen through twelve.

An internal PST value (the CPST signal of FIG. 2) transfers a $5 value in a first timing cycle. As illustrated in FIG. 10, when the PST value has a value of $5, data processor is beginning to execute a taken branch instruction. This corresponds to the JMP instruction which is transferring a program flow to an address indirectly specified by register A0. During this first timing cycle illustrated in FIG. 11, an internal DDATA signal (the FIFO signal of FIG. 2) transfers a $0 value. As illustrated in FIG. 9, when the DDATA value stores the value of $0, no breakpoints are enabled in data processor 3.

During a second timing cycle, the internal PST value transfers a $9 value to indicate that the target address for the JMP instruction will be specified in the next two bytes of information provided via the internal DDATA value. At this point, the internal DDATA signal continues to transfer the $0 value. As previously mentioned, when the internal PST value transfers a status value of $8, $9, $A, or $B, the internal PST signal is being used to qualify the values provided externally via the DDATA signal. In this operation, the internal PST signal is used as a "marker" to indicate which values on the internal DDATA signal are providing required target address information. The internal PST signal is encoded with these status values one timing cycle before the actual data is displayed on the internal DDATA signal.

During a third timing cycle, the internal PST value transfers a $0 value to indicate that instruction execution continues. Additionally, during the third timing cycle, the internal DDATA signal provides bits three through zero of the target address value.

During a fourth timing cycle, the CPST value represents the value defined by the first instruction located at the Target address. At this time, the internal DDATA signal transfers bits seven through four of the target address value. Subsequently, in the fifth and sixth timing cycles, the internal DDATA signal respectively provides bits eleven through eight and bits fifteen through twelve of the target address value. In this manner, external development system 7 is able to observe both a current record of a branch operation having variant addressing and an indirectly determined address location in real time.

The plurality of multiplexers 80 provide the internal PST and the internal DDATA signals to external development system 7 as the PST and DDATA signals, respectively. The PST and DDATA signals are provided via integrated circuit pins (not shown in detail). Additionally, it should be noted that the PST and DDATA signals provided via the integrated circuit pins communicate information one timing cycle after the information is transferred via the internal PST and internal DDATA signals, respectively.

By allowing such real time observation, external development system 7 is able to identify and isolate failures more quickly and more accurately. Furthermore, while the real time trace observation is being provided to external development system 7, CPU 2 of data processor 3 continues execution of instructions and is generally unaffected by the provision of the DDATA and PST signals.

Furthermore, while the example provided above described the use of a trace function for executing a JMP instruction, the present invention may be used to completely track a dynamic execution path of data processor 3. As was illustrated with the JMP instruction, the tracking of the dynamic execution path is complicated by any change of flow operation. For example, some branch instructions may be implemented using variant addressing in which a calculation of a target instruction address is not PC (program counter) relative or absolute, but involves the use of a program visible register.

For instructions utilizing variant addressing, the present invention provides the DDATA and PST signals in a specified sequence such that a target address may be correctly determined and provided to external development system 7. First, execution of a taken branch instruction is identified by the PST signal transferred via a plurality of integrated circuit pins. As is illustrated in the encoding of FIG. 10, the PST signal indicates that a taken branch instruction is being executed when the PST signal has a value of $5. Next, the PST signal may be used to indicate that a target address is to be displayed on the DDATA signal. An encoding of the PST signal identifies a number of bytes which are to be displayed via the DDATA signals. The target address is then optionally available on subsequent timing cycles using the DDATA signal. A number of bits of the target address displayed on the DDATA signal is a configurable parameter which is controlled by an external user.

The present invention provides a unique trace function which is executed dynamically and without a significant impact on the performance of CPU 2 of data processor 3.

Note that in the real time trace function implemented by the present invention there is strict synchronization between an executed instruction stream as defined by the PST signal and the availability of the captured data provided by the DDATA signal. In the embodiment of the invention described herein, there is strict ordering such that the DDATA signal may be easily associated with an appropriate instruction. This ordering is described in greater detail in the following example. Assume the following code is to be executed in the following example.

| Instruction Address | Instruction | |
|---|---|---|
| 00001316 | movq | #1,d0 |
| 00001318 | mov.1 | d0,(−4,a6) |
| 0000131c | pea | (−68,a6) |
| 00001320 | pea | (−36,a6) |
| 00001324 | bsr.w | Func2 |
| 0000115c | mov.1 | d7,−(a7) |

In the above example, if the CSR is configured to display two bytes of branch target address information, if all operands generate M-Bus 23 accesses, and if both read and write operands are captured, a resulting output on the PST signal and the DDATA signal appears as follows.

| PST | DDATA | Description |
|---|---|---|
| $1 | — | Begin instruction at 1316 |
| $1 | — | Begin instruction at 1318 |

-continued

| PST | DDATA | Description |
|---|---|---|
| $b | — | Write operand for the instruction at 1318 |
| 0 | [3:0] | Bits from a write operand for the instruction at 1318 |
| 0 | [7:4] | Bits from a write operand for the instruction at 1318 |
| 0 | [11:8] | Bits from a write operand for the instruction at 1318 |
| 0 | [15:12] | Bits from a write operand for the instruction at 1318 |
| 0 | [19:16] | Bits from a write operand for the instruction at 1318 |
| 0 | [23:20] | Bits from a write operand for the instruction at 1318 |
| 0 | [27:24] | Bits from a write operand for the instruction at 1318 |
| 0 | [31:28] | Bits from a write operand for the instruction at 1318 |
| $1 | — | Begin the instruction at 131c |
| $b | — | Write operand for the instruction at 131c |
| 0 | [3:0] | Bits from a write operand for the instruction at 131c |
| 0 | [7:4] | Bits from a write operand for the instruction at 131c |
| 0 | [11:8] | Bits from a write operand for the instruction at 131c |
| 0 | [15:12] | Bits from a write operand for the instruction at 131c |
| 0 | [19:16] | Bits from a write operand for the instruction at 131c |
| 0 | [23:20] | Bits from a write operand for the instruction at 131c |
| 0 | [27:24] | Bits from a write operand for the instruction at 131c |
| 0 | [31:28] | Bits from a write operand for the instruction at 131c |
| $1 | — | Begin the instruction at 1320 |
| $b | — | Write operand for the instruction at 1320 |
| 0 | [3:0] | Bits from a write operand for the instruction at 1320 |
| 0 | [7:4] | Bits from a write operand for the instruction at 1320 |
| 0 | [11:8] | Bits from a write operand for the instruction at 1320 |
| 0 | [15:12] | Bits from a write operand for the instruction at 1320 |
| 0 | [19:16] | Bits from a write operand for the instruction at 1320 |
| 0 | [23:20] | Bits from a write operand for the instruction at 1320 |
| 0 | [27:24] | Bits from a write operand for the instruction at 1320 |
| 0 | [31:28] | Bits from a write operand for the instruction at 1320 |
| $5 | — | Begin taken-branch instruction at 1324 |
| $9 | — | Target address for the instruction at 1324 |
| 0 | $c | Bits from target address (115c) |
| 0 | $5 | Bits from target address (115c) |
| 0 | $1 | Bits from target address (115c) |
| 0 | $1 | Bits from target address (115c) |
| $b | — | Write operand for instruction at 1324 |
| 0 | $8 | Bits from return address for the instruction at 1324 |
| 0 | $2 | Bits from return address for the instruction at 1324 |
| 0 | $3 | Bits from return address for the instruction at 1324 |
| 0 | $1 | Bits from return address for the instruction at 1324 |
| 0 | $0 | Bits from return address for the instruction at 1324 |
| 0 | $0 | Bits from return address for the instruction at 1324 |
| 0 | $0 | Bits from return address for the instruction at 1324 |
| 0 | $0 | Bits from return address for the instruction at 1324 |
| $1 | — | Begin instruction at 115c |

Note that in the example provided above, the PST and DDATA signals remain synchronized so that a given operand being displayed on the DDATA signal may always be guaranteed to be associated with a given instruction. For purposes of clarity of explanation, the above example illustrates no overlap between the DDATA signal and a non-zero PST value. However, this may occur but the relationship between the PST and DDATA signals is not violated.

Real Time Debug Support

In addition to real time trace functions, the present invention also provides a circuit and method for executing real time debug functions. In many data processors, especially embedded systems, the data processor may not be halted during a debug operation due to system constraints or an inability to identify a failing circuit or program when the data processor is no longer operating in a normal mode. The present invention executes the debug operation by only minimally intruding on the real time operation of the data processor and without halting the data processor.

Breakpoint operations are typically used during a debugging operation to identify a programming event. When the programming event is encountered, a breakpoint signal is asserted and data is retrieved to determine a status of a software program. Like the trace function, the breakpoint operation allows an external user to ascertain a status of each of a plurality of selected registers and memory locations such that data processing errors may be identified.

The present invention provides the plurality of hardware breakpoint registers 50 and breakpoint circuit 100 to perform such breakpoint operations. In the present invention, breakpoint operations based on a value of the program counter or a program counter mask, an operand address range, and a data value or data mask value are all implemented. Additionally, the breakpoint operations implemented in the present invention may also be configured into one or two-level triggers wherein an exact trigger response is programmable via the Trigger Definition Register (TDR) of the plurality of control registers 40. Execution of the breakpoint operation using the present invention will subsequently be described in greater detail.

Each of the plurality of hardware breakpoint registers 50 may be written by either external development system 7 or by CPU 2 of data processor 3. As illustrated in FIG. 3, the Address Breakpoint registers (ABLR and ABHR) define a region in an operand logical address space of data processing system 5 which may be used to trigger a breakpoint function. The Address Attribute Breakpoint Register (AABR), illustrated in greater detail in FIG. 6, defines a plurality of address attributes and a mask to be matched in the trigger for the breakpoint function. Like the ABLR and ABLR address values, an attribute value stored in the AABR is compared with an address attribute signal transferred via K-Bus 25.

The plurality of hardware breakpoint registers 50 also include a plurality of Program Counter Breakpoint registers. The plurality of Program Counter breakpoint registers define a region in an instruction logical address space of data processing system 5 which may be used to trigger a breakpoint function. The Program Counter Breakpoint (PBR) value may be masked by a value stored in the Program Counter Breakpoint Mask (PBMR) register. In one embodiment of the invention, only those bits in the PBR which have a corresponding zero value stored in the PBMR are used in a comparison operation with a program counter value of data processing system 5. Note that the program counter value is stored in a program counter register (not illustrated herein) of CPU 2 of data processing system 5.

In addition to the Program Counter Breakpoint registers, the plurality of hardware breakpoint registers 50 include a plurality of Data Breakpoint Registers. The plurality of Data Breakpoint Registers include a Data Breakpoint Register (DBR) and a Data Breakpoint Mask Register (DBMR). The DBR stores a data value which defines a specific data pattern which may be used to form a trigger when data processing system 5 is performing a debug operation. A data mask value stored in the DBMR masks the data value stored in the DBR. Thus, in one embodiment of the present invention, only those bits stored in the DBR which have a corresponding zero value stored in the DBMR may be compared with data signals transferred via K-Bus 25 to determine if a trigger condition is met.

Each of the plurality of hardware breakpoint registers 50 may be differently configured to respond to triggers using the TDR of the plurality of control registers 40. Independent of the configuration indicated by the TDR, an indication of a triggered breakpoint is provided on the DDATA signal whenever the DDATA signal is not displaying captured operands and addresses. The output of the DDATA signal is illustrated in FIG. 9.

FIG. 9 illustrates a relationship between a value provided via bits three through zero of the DDATA signal and a breakpoint status. Note that bits thirty-one through twenty-eight of the CSR correspond to bits three through zero of the DDATA signal.

When the DDATA signal has a value of $0, no breakpoints are enabled. When the DDATA signal provides a logical value of $1, debug module 10 is waiting for a level one breakpoint to be triggered. As previously discussed, attributes of the level one breakpoint are defined by bits fifteen through zero of the Trigger Definition Register (TDR). If a logical value of $2 is provided by the DDATA signal, the level one breakpoint has been triggered. When the DDATA signal provides a logical value of $5, debug module 10 is waiting for a level two breakpoint to be triggered. As previously discussed, attributes of the level two breakpoint are defined by bits thirty-one through sixteen of the Trigger Definition Register (TDR). If a logical value of $6 is provided by the DDATA signal, the level two breakpoint has been triggered.

Note that a status of the breakpoint operation is also stored in bits thirty-one through twenty-eight of the CSR.

Prior to execution of a debug operation, a breakpoint value must be stored in an appropriate one of the plurality of hardware breakpoint registers 50. The breakpoint value may be provided by external development system 7 through serial interface 30 or by CPU 2 through K-Bus 25.

To perform this write function from an external device, external development system 7 shifts in a command to load data into a preselected one of the plurality of hardware breakpoint registers 50 to serial interface 30 using both the DSDI and DSCLK signals. In one embodiment of the present invention, a first portion of the command is provided by the DSDI signal and clocked in by the DSCLK signal. Additional portions of the commands are subsequently provided. All portions of the command are stored in register 32 until a sixteen bit packet of information is complete. Note that alternate embodiments of the present invention may include more or less bits than the sixteen bits required in the present embodiment of the invention.

In another embodiment of the invention, the breakpoint value may be determined by a value written into the preselected one of the plurality of breakpoint registers 50 by CPU 2 of data processor 3. When CPU 2 writes the value into the preselected one of the plurality of breakpoint registers 50, the value is provided to temporary register 170 of breakpoint circuit 100 illustrated in FIG. 3. The value is provided to temporary register 170 via K-Bus 25. From temporary register 170, the value is transferred and stored in register 32 in sixteen bit packets. As was previously mentioned, for a CPU write to the CSR, the operand value transferred via the KDATA signal is captured into temporary data register 170 using control signals provided by CPU 2 to control circuit 20 via Control bus 15. Therefore, to the plurality of control registers 40, the breakpoint values appear to be the same as those provided to register 32 from external development system 7.

Once the breakpoint value is written into the preselected one of the plurality of breakpoint registers 50, CPU 2 executes programming code in a normal mode of operation. During execution of that programming code, address information is communicated via the KADDR signal of K-Bus 25 and data information is communicated via the KDATA signal of K-Bus 25. Additionally, program counter information in CPU 2 continually updates a value stored in temporary PC register 125 for purposes of a program counter breakpoint comparison operation.

As address, data and program counter information is transferred to hardware circuit 100, comparators 130, 140, 180, and 135 receive the information and selectively perform comparison operations without adversely affecting the performance of data processor 3. Furthermore, a plurality of control values are provided to hardware circuit 100 from the TDR of the plurality of control registers 50 via Control bus 15. The plurality of control values include the previously described values of the TDR which selectively configure a trigger operation using hardware circuit 100.

For example, when external development system 7 determines that a breakpoint should be asserted when an address falls within a certain range of addresses, external development system 7 must write a high address value into ABHR 110 of FIG. 3 and a low address value into ABLR 120 of FIG. 3 using serial interface 30. However before comparator 130 and comparator 140 may determine if an address provided by the KADDR signal of K-Bus 25 is within a range defined by the addresses stored in ABLR 120 and ABHR 110, the TDR of the plurality of control registers 40 must provide appropriate control via Control bus 15.

In this example, the appropriate control includes either an asserted Enable Address Range (EAR) bit or an asserted Enable Address Breakpoint Inverted (EAI) bit. As previously discussed, the EAR bit enables a breakpoint to trigger on an inclusive range defined by ABLR 120 and the ABHR 110 when the bit is asserted. Likewise, when asserted, the EAI bit enables the breakpoint to trigger on an address range exclusive, or outside, of the range defined by ABLR 120 and ABHR 110.

Depending on logical values of the EAR and EAI bits, comparators 130 and 140 will determine if an address value transferred via the KADDR signal is greater than or less than an associated value in ABHR 110 and ABLR 120. If the EAR bit is asserted and the address value transferred via the KADDR signal is within a range defined by address values in ABHR 110 and ABLR 120, comparators 130 and 140 assert the Breakpoint signal to indicate that a preselected trigger point was accessed. When the Breakpoint signal is asserted, control circuit 20 asserts one of a BKPT (Breakpoint) signal, a Debug Interrupt signal, and a Go signal transferred via the multi-conductor Breakpoint Control signal to CPU 2 of core 9.

When the Breakpoint signal is asserted, the occurrence of a breakpoint trigger generates a response as defined in the TDR. If data processor 3 may be halted; assertion of the BKPT signal will force CPU 2 to halt execution in a background debug mode. Note that background debug mode will subsequently be discussed in slightly more detail. To enter into the background debug mode, the TRC bits of the TDR should equal %01. Note that the TRC bits correspond to bits thirty-one and thirty of the TDR. When the background debug mode is entered and a breakpoint based on a program counter value is asserted, CPU 2 halts execution of data processor 3 before a targeted instruction is executed. For breakpoints based on address and data comparisons, CPU 2 may execute several additional instructions before halting. Note that this type of breakpoint operation should only be used for non-real-time debug operations since data processor 3 is halted in response to the trigger.

However, if data processor 3 may not be halted, control circuit 20 asserts the Debug Interrupt signal to indicate that a special debug interrupt should be provided to CPU 2. When the special debug interrupt should be provided to CPU 2, the TRC bits of the TDR are set to a logical value of %10. When the TRC bits are set to %10, the breakpoint trigger is converted into the special debug interrupt to CPU 2 by control circuit 20. The special debug interrupt is made pending until CPU 2 samples for interrupts. CPU 2 samples once per instruction. When the special debug interrupt is asserted, a breakpoint based on a program counter value occurs before a targeted instruction is executed. This is possible because the program counter comparison operation is enabled at a same time CPU 2 samples to determine if the interrupt is pending. For breakpoints based on address and data comparisons, CPU 2 may execute several additional instructions before executing the interrupt operation.

When the special debug interrupt is recognized by CPU 2, CPU 2 aborts execution of a software program and initiates an exception processing routine. At the initiation of the exception processing routine, CPU 2 enters into an emulator mode of operation. Note that all interrupts are ignored when CPU 2 is operating in the emulator mode of operation. Depending on a state of the MAP bit in the CSR of the plurality of control registers 40, the emulation mode of operation may force all memory accesses into a specially mapped address spaced indicated by the TT and TM values of the AABR register of the plurality of hardware breakpoint registers 50. In this example, the TT value equals $2 and the TM value equals either $5 (operands) or $6 (instructions).

After a standard eight byte exception stack is created, CPU 2 fetches a unique exception vector. CPU 2 continues execution at an instruction address included in the unique exception vector. A debug interrupt handler in CPU 2 may be programmed to perform a plurality of necessary save operations using a supervisor instruction set. As an example, the debug interrupt handler may save a state of all of the program visible registers and any special memory location into a reserved memory space. The reserved memory space may be located in memory 6 or it may be located in any other memory in data processing system 5. Once the required operations are completed, a Return From Exception (RTE) instruction is executed and CPU 2 exits an emulator mode of operation. When CPU 2 receives the debug interrupt signal and enters an emulator mode of operation, the PST signal has a value of $D to signal this condition. The PST signal has this value from the time the debug interrupt is processed until the first instruction of the debug interrupt exception processing routine is fetched. Additionally, the PST signal has a value of $7 to indicate that CPU 2 has exited from the emulator mode of operation. Furthermore, once the debug interrupt handler has completed its execution of the debug exception processing routine, external development system 7 may then access the reserved memory locations in memory 6 or another memory in data processing system 5 which includes the reserved memory locations.

The debug interrupt may be used for real-time debug operations where a slight intrusion in normal operation of data processor 3 may be tolerated, but halting data processor 3 is not an option. Note also that the data processor's entry into and exit from emulator mode are signaled by unique values on the PST signal.

Additionally, it should the noted that other comparisons based on a single address, rather than a range, on a data value or a mask of the data value, and on a program counter value or a mask of the program counter value may be implemented in the present invention. As with the address range comparison described in the example above, comparisons based on the data value, the mask of the data value, the program counter value, and the mask of the program value require the TDR to provide appropriate control values via Control bus 15.

Multi-level Trigger Constructs

The real time debug operation performed by the present invention may be expanded to provide two levels of trigger values. In the present embodiment of the invention, bits 31 through 16 define a second level trigger and bits 15 through 0 define a first level trigger. When the trigger is configured as a two level trigger, the trigger functions in a manner similar to a conditional "if-then-if" construct. For example, if a first condition, or level, of a trigger is satisfied, a second condition, or level, must be satisfied before the trigger enables a breakpoint function to be executed by data processing system 5. Such a conditional trigger construct allows external development system 7 to function with both increased flexibility and precision. Note that in this embodiment of the present invention, only two levels of trigger constructs are implemented. However, additional levels of trigger constructs may be implemented.

As an example of a two level trigger operation, assume that external development system 7 desires to define a trigger as a user mode operand word write of any value other than $FEED to address $0000FACE, followed by the program counter being equal to a value of $DEADBEEF. A first level trigger will be a user mode operand word write of any value other than $FEED to address $0000FACE. A second level trigger will occur when the program counter is equal to a value of $DEADBEEF.

To execute this operation, external development system 7 may write the value $DEADBEEF to Program Counter Breakpoint Register (PBR) 115 and the value of $000000000 to Program Counter Breakpoint Mask Register (PBMR) 190. When all zeroes are written to PBMR 190, all bits stored in PBR 115 are compared to a program counter value provided by temporary PC register 125. Note that the comparison operation is executed in response to the value stored in the TDR of the plurality of control registers 40.

External development system 7 must also write a value of $0000FACE to Address Breakpoint Low Register (ABLR)

120 and a value of $0041 to Address Attribute Breakpoint Register (AABR) of FIG. 6. The value of $0000FACE in ABLR 120 indicates the value at which comparator 140 will assert the Breakpoint signal if the configuration of the TDR allows the comparison to occur. The value of $0041 in the AABR sets the TM value to %001, the TT value to %00, the SZ value to %10, and the R (Read) bit to 0. The TM and TT values serve to ensure that the trigger will be a user mode operand word write operation.

External development system 7 must write a value of $0000FEED to Data Breakpoint Register (DBR) 160 of breakpoint circuit 100. External development system 7 must also write the value of $000000000 to Data Breakpoint Mask Register (DBMR) 150. When all zeroes are written to DBMR 150, all bits stored in DBR 160 are compared to a data value provided by the KDATA signal using comparator 180. Note that the comparison operation is executed in response to the value stored in the TDR of the plurality of control registers 40.

Lastly, external development system 7 must write the TDR of the plurality of control registers 40 with a value of $20022824. When the TDR has this value, the first level trigger has the following characteristics. In this example, the EBL bit is asserted, the EDLW bit is negated, the EDWL bit is asserted, and the EDWU, EDLL, EDLM, EDUM, and EDUU bits are all negated. The DI bit is asserted, the AI and EAR bits are negated, the EAL bit is asserted, and the EPC and PCI bits are negated. With this configuration, the TDR configures the first level trigger to be enabled to assert the Breakpoint signal for a word length data value which is not stored the same as the value stored in DBR 160. Furthermore, the TDR is configured to assert the first level trigger when each of the aforesaid conditions is met and the address value stored in ABLR 120 corresponds to a value provided by the KADDR signal. When each of the aforesaid conditions determined by the TDR is satisfied, the first level trigger is asserted and then the second level trigger must be satisfied before the Breakpoint signal may be asserted.

Furthermore, when the TDR has this value, the second level trigger the following characteristics. In this example, the TRC value is %00, the EBL bit is asserted, the EDLW, EDWL, EDWU, EDLL, EDLM, EDUM, and EDUU bits are all negated. The DI, AI, EAR, and EAL bits are negated, the EPC bit is asserted, and the PCI bit is negated. With this configuration, the TDR configures the second level trigger to be enabled to assert the Breakpoint signal for a program counter value which is the same as that stored in PBR 115. When each of the aforesaid conditions determined by the TDR is satisfied, the second level trigger is asserted and the Breakpoint signal may be asserted.

As previously mentioned, assertion of the Breakpoint signal may result in a programmable trigger response. The trigger response is programmed into bits 31 and 30 of the TDR of the plurality of control registers 40. When correctly programmed, the trigger response of CPU 2 of data processor 3 may be to make the trigger visible to external development system 7 via the DDATA signal and cause no internal response. A second trigger response would force CPU 2 to halt execution and to externally indicate that CPU 2 is in a halted state via the PST signal. A third trigger response would generate a debug interrupt to CPU 2. As previously mentioned, the debug interrupt is higher in priority than all other interrupts and causes CPU 2 to enter into an emulator mode of operation and to access a unique exception processing routine. Entry to and exit from the emulator mode of operation are made externally visible on the PST outputs.

Simultaneous Operation of the Debug Module and the Core

To support the real time debug functions described above, the present invention supports the concurrent operation of core 9 and debug module 10. An arbitration scheme which effectively schedules bus cycles on K-Bus 25 for debug module 10 is implemented in the present invention to allow for the efficient execution of real time debug operations. The arbitration scheme effectively schedules bus cycles for debug module 10 by stalling an internal instruction fetch pipeline of CPU 2. The arbitration scheme waits until all operand requests have been serviced by CPU 2 before granting debug module 10 access to K-Bus 25. Debug module 10 receives the Bus Grant signal and drives K-Bus 25 with the required address stored in ABHR 110 and attributes stored in the AABR of FIG. 6. For a read request, the response is driven onto the KDATA signal and captured by debug module 10 in temporary data register 170. For a write reference, the write operand is driven from DBR 160 onto the KDATA signal. Debug module 10 performs this operation in one bus transaction before relinquishing K-Bus 25 back to CPU 2. Therefore, debug module 10 minimizes its intrusion into the real time operating behavior of CPU 2. The arbitration scheme for K-Bus 25 is executed by logic stored in CPU 2.

In an example which illustrates the concurrent operation of CPU 2 and debug module 10, assume that external development system 7 is executing a memory read operation during a debug function. To execute a memory read instruction, external development system 7 shifts in a command and address to access a memory location to serial interface 30 using both the DSDI and DSCLK signals. In one embodiment of the present invention, a first portion of the command is provided by the DSDI signal and clocked in by the DSCLK signal. Additional portions of the commands are subsequently provided. All portions of the command are stored in register 32 until a sixteen bit packet of information is complete. Note that alternate embodiments of the present invention may include more or less bits than the sixteen bits required in the present embodiment of the invention.

In the embodiment of the invention described herein, an instruction which writes a value to the preselected memory location is forty-eight bits long with a sixteen bit opcode and thirty-two bits of address. Register 32 is only sixteen bits wide. Therefore, when a first sixteen bit packet of information is complete, the information is transferred to control circuit 20 via Control bus 15. Control circuit 20 decodes the first sixteen bit packet of information to determine a type of operation which should be performed. Once control circuit 20 decodes the first sixteen bit packet of data and determines that a read access from a programmed memory location is to be performed, control circuit 20 provides a control signal via Control bus 15 to enable the subsequent thirty-two bits of address information to be loaded into ABHR 110 of the plurality of hardware breakpoint registers 50.

The subsequent data is serially provided by external development system 7 via the DSDI signal. As previously described, the subsequent data provided by the DSDI signal is clocked in via the DSCLK signal. Each of the data bits is stored in register 32 until a sixteen bit packet of information is complete. When a second sixteen bit packet of information is complete, the information is transferred to ABHR 110 of the plurality of hardware breakpoint registers 50 via the Serial Information signal. Subsequently, additional information is serially provided by external development system 7 to register 32 via the DSDI and DSCLK signals. When a third sixteen bit packet of information is complete, the information is transferred to ABHR 110 of the plurality of hardware breakpoint registers 50 via the Serial Information signal When the operand and address information have been received, control circuit 20 asserts the Bus Request signal. The Bus Request signal is transferred to CPU 2 via K-Bus 25. Again, the Bus Request and the Bus Grant signals are direct connections between debug module 10 and CPU 2. The details of bus arbitration have been previously explained.

When the Bus Grant signal is asserted, ABHR 110 is enabled to provide the address information stored therein to K-Bus 25 via the KADDR signal. The address information is decoded by memory 6 to read a memory location therein. Because a read operation is executed, memory 6 outputs an operand corresponding to the memory location on the KDATA signal of K-Bus 25. Note that the accessed memory is not limited to memory 6. Rather, the accessed memory may be memory 6 or any other memory location in data processing system 5. The operand transferred via the KDATA signal is subsequently captured in temporary data register 170 of breakpoint circuit 100. The operand is subsequently transferred to register 32 via the Internal Data signal. The operand is then serially shifted out in thirty-two timing cycles via the DSDO signal provided by serial interface 30. The DSDO signal is provided to external development system 7.

Additionally, note that after the operand is transferred via the KDATA signal, CPU 2 resumes execution of data processing instructions with minimal intrusion into processing speed. Therefore, CPU 2 is able to perform data processing functions while serial interface 30 is outputting information.

It should be noted that the present invention provides concurrent operation of CPU 2 and debug module 10 without requiring data processor 3 to operate in a special debug mode. The use of K-Bus 25 to communicate data, address, and control information between core 9 and debug module 10 allows debug module 10 to access the same memory locations and internal registers as CPU 2. Therefore, debug module may access all the memory locations and internal registers that CPU 2 is able to access. The ability to concurrently operate CPU 2 and debug module 10 allows external development system 7 to have increased visibility in the internal registers and memory of data processor 3 without significantly impacting operation of the processor.

Additionally, note that while debug module 10 and CPU 2 both have the ability to access the same internal registers and memory locations, CPU 2 and a remaining portion of core 9 may not modify a value stored in the plurality of breakpoint registers 50 when the Inhibit Processor Writes to Debug Registers (IPW) bit in the CSR of the plurality of control registers 40 is set. When the IPW bit in the CSR is set, any write operations initiated by CPU 2 are inhibited. Furthermore, the IPW bit may only be modified by a command provided by external development system 7.

To set the IPW bit, external development system 7 shifts in a command to load data into the CSR to serial interface 30 using both the DSDI and DSCLK signals. As was previously mentioned, in one embodiment of the present invention, a first portion of the command is provided by the DSDI signal and clocked in by the DSCLK signal. Additional portions of the commands are subsequently provided. All portions of the command are stored in register 32 until a sixteen bit packet of information is complete. Note that alternate embodiments of the present invention may include more or less bits than the sixteen bits required in the present embodiment of the invention.

In the embodiment of the invention described herein, an instruction which writes a value to the CSR is forty-eight bits long with a sixteen bit opcode and thirty-two bits of data. Register 32 is only sixteen bits wide. To perform this write instruction, external development system 7 shifts in a command to load data into the CSR to serial interface 30 using both the DSDI and DSCLK signals. A first portion of the command is provided by the DSDI signal and docked in by the DSCLK signal. Additional portions of the commands are subsequently provided. All portions of the command are stored in register 32 until a sixteen bit packet of information is complete.

In the embodiment of the invention described herein, an instruction which writes a value to the CSR is forty-eight bits long with a sixteen bit opcode and thirty-two bits of data. Register 32 is only sixteen bits wide. Therefore, when a first sixteen bit packet of information is complete, the information is transferred to control circuit 20 where it is decoded and subsequent operations are configured. When a second sixteen bit packet of information has been loaded into register 32, the information is transferred to the plurality of control registers 40 via the Serial Information signal. Using control information provided by Control bus 15 from control circuit 20, the contents of the Serial Information signal are loaded into the upper portion of a destination register, the CSR. In a similar manner, a third sixteen bit packet of information is loaded into register 32 and then transferred to the plurality of control registers 40. Again, using signals sourced by control circuit 20, the contents of the Serial Information signal are loaded into the lower portion of the CSR. In this manner, the entire forty-eight bit instruction is serially shifted into debug module 10, where it is decoded and the operand value is loaded into the CSR.

The subsequent data is serially provided by external development system 7 via the DSDI signal. As previously described, the subsequent data provided by the DSDI signal is clocked in via the DSCLK signal. Each of the data bits is stored in register 32 until a sixteen bit packet of information is complete. When a second sixteen bit packet of information is complete, the information is transferred to the plurality of control registers 40 via the Serial Information signal. The second sixteen bit packet of information is stored in the CSR as bits thirty-one to sixteen. Subsequently, additional information is serially provided by external development system 7 to register 32 via the DSDI and DSCLK signals. When a third sixteen bit packet of information is complete, the information is transferred to the plurality of control registers 40 via the Serial Information signal. The third sixteen bit packet of information is stored in the CSR as bits fifteen to zero.

In another embodiment of the invention, all values other than the IPW bit may be configured by a value written into the CSR by CPU 2 of data processor 4. When CPU 2 writes the value into the CSR, the value is provided to temporary register 170 of breakpoint circuit 100 illustrated in FIG. 6. The value is provided to temporary register 170 via the KDATA signal of K-Bus 25. From temporary register 170, the value is transferred and stored in register 32 in sixteen bit packets. Therefore, to the plurality of control registers 40, the values appear to be the same as those provided to register 32 from external development system 7.

The IPW bit and other values stored in the CSR are provided to hardware circuit 100 via Control bus 15. When the IPW bit is asserted and CPU 2 attempts to modify a value stored in one of ABHR 110, ABLR 120, DBMR 150, DBR 160, PBMR 190, and PBR 125, the IPW bit is provided to each of aforementioned registers to disable any write operation initiated by core 9.

The use of the IPW bit to effectively disable write operations to the plurality of hardware breakpoint registers 50 ensures that a condition programmed by external development system 7 to isolate and identify failing circuitry and erroneous programs in data processor 3 will not be overwritten by CPU 2.

Debug Operations during Reset Exception Processing

The present invention provides a mechanism to allow external development system 7 to execute a breakpoint operation in data processor 3 before an exception processing routine for a reset operation is initiated. When the External Reset signal is asserted, the contents of each of the plurality of control registers 40 are initialized. When the External Reset signal is subsequently negated, a window of time exists in which data processor 3 is quiescent before beginning an actual reset exception processing routine. If an external breakpoint signal, $\overline{BKPT}$ is asserted during the quiescent time by external development system 7, the present invention provides a mechanism and method for downloading a target memory value into data processing system 5 and for performing any required hardware register configuration. The target memory value may be a single value or a plurality of values.

Once the target memory value has been downloaded by external development system 7, one or both of the plurality of control registers 40 and the plurality of hardware breakpoint registers 50 may be configured. Additionally, hardware registers included in CPU 2, MMU/controller 4, and system bus controller 8 may also be programmed. Finally, data processor 3 must be restarted using a "Go" command. However, in the present invention, a series of hardware operations executed upon receipt of the "Go" command are a function of the hardware registers which were modified while CPU 2 was executing a breakpoint operation. If external development system 7 did not modify a program counter register of CPU 2, the "Go" command enables data processor 3 to execute a normal reset exception processing routine. However, if external development system 7 did modify the program counter register of CPU 2, the "Go" command enables data processor 3 to bypass the normal reset exception processing routine and begin execution an instruction identified by an address loaded in the program counter register.

Operation of data processor 3 during such a reset and breakpoint operation will subsequently be discussed in greater detail. Assume that the Reset signal is asserted and provided to CPU 2 of data processor 3. When the Reset signal is negated, external development system 7 asserts the BKPT signal. Control circuit 20 of debug module 10 asserts the BKPT signal of the plurality of Breakpoint Control signals to CPU 2 via K-Bus 25. Again, note the control interface is a direct connection between debug module 10 and CPU 2.

When CPU 2 receives an asserted BKPT signal, CPU 2 suspends a quiescent time window and signals that data processor 3 is halted. During the time, the PST signals have a logical value of $F to indicate to external development system 7 that data processor 3 has halted operation. Thus, CPU 2 and data processor 3 are halted before beginning a reset exception processing routine.

Once the PST signals indicate that data processor 3 has halted operations, external development system 7 downloads a plurality of data, address, and control values to data processor 3 via the DSDI signal and the DSCLK signal. The plurality of data, address, and control values may be a memory image of a program or data values to be stored in memory 6. Additionally, the plurality of data, address, and control values may provide a plurality of initialization values for each of a plurality of configuration registers such as the plurality of control registers 40 and the plurality of hardware breakpoint registers 50. Note, that when the plurality of data, address, and control values are provided to data processor 3 via the DSDI signal, each bit of the value is provided to register 32 via serial interface 30. When register 32 is full, a packet of information is provided to the plurality of hardware breakpoint registers 50 via the Serial Information signal. In the plurality of hardware breakpoint registers 50, the packet of information is stored in a registers such as temporary data register 170. Temporary data register 170 subsequently provides the information stored therein to K-Bus 25 via the KDATA signal. K-Bus 25 transfers the information to a remaining portion of core 9. As this operation has been previously described in greater detail, no additional explanation of the internal storage procedure will be provided herein.

After the plurality of data, address, and control values have been stored in an appropriate memory or register location of data processor 3, external development system 7 provides a "Go" command to data processor 3 via the DSDI and DSCLK signals. Like the plurality data, address, and control values, the "Go" command is provided to data processor 3 via the DSDI signal. Each bit of the "Go" command is provided to register 32 via serial interface 30. When register 32 is full, a packet of information is provided to control circuit 20 via Control bus 15. Control circuit 20 decodes the "Go" command to provide the Go signal to CPU 2 via K-Bus 25.

When CPU 2 responds to the Go signal, the instructions which it executes are determined by the registers modified by the plurality of address, data and control values provided by external development system 7. For example, if a program counter (not shown in detail) in CPU 2 was modified, CPU 2 begins processor execution from a new instruction address stored in the modified program counter. If however, the program counter in CPU 2 was not modified, CPU 2 continues with a normal reset exception processing routine.

The ability of the present invention to breakpoint data processor 3 before execution of the reset exception processing routine proves an efficient and useful mechanism for allowing external development system 7 to configure data processor 3 in a required manner without a chance that the values will be overwritten during execution of the reset exception processing routine.

This ability to execute a breakpoint operation before a reset exception processing routine is executed also allows external development system 7 to bypass programming any non-volatile memory storage. By loading the new software image into writable memory storage, the code programmed in the non-volatile storage can be easily bypassed. External development system 7 may access any hardware register by shifting in an eighty bit instruction. The eighty bit instruction includes a sixteen bit opcode, a thirty-two bit address mapped into CPU space, and thirty-two bits of operand data. Once the complete command is received, debug module 10 operates in a manner similar to a memory referencing operation. K-Bus 25 is requested, then granted by CPU 2. A CPU-space K-Bus cycle is initiated by debug module 10 and the appropriate hardware register is written.

Background Debug Mode

When data processor 3 is operating in a special background debug Mode, CPU 2 is halted to allow debug module 10 to completely access all memory and register values so that faulty circuits and erroneous programs may be isolated and identified. Registers and memory locations may be viewed and selectively altered when in the background debug mode. Furthermore, test features may be enabled.

While external development system 7 may easily access internal information via debug module 10 when it is operating in the special background debug mode, normal instruction execution is suspended since CPU 2 must be halted in this mode of operation. Note that when CPU 2 is halted, the PST signal has a value of $F.

The special background debug mode of operation may be generated by many sources. For example, the $\overline{\text{BKPT}}$ signal may be externally generated by external development system 7 to selectively enable data processor 3 to enter into the background debug mode of operation. Additionally, internally generated breakpoint operations and catastrophic exception conditions may also enable data processor 3 to enter into the background debug mode of operation.

Once data processor 3 enters the background debug mode of operation, normal operation of data processor 3 is halted and special functions are performed by debug module 10 under control of external development system 7. All communication between debug module 10 and external development system 7 is through serial interface 30 and each of the DSDI, DSDO, and DSCLK signals.

As previously mentioned, in the present embodiment of the invention, background debug mode is signaled to the external user via the PST signal. A value of $F on the PST signal indicates the processor is halted and operating in a background debug mode of operation. The indication of entry into background debug mode is significant as it provides a signal to allow the external user to initiate the supported debug commands via a serial communications channel. Therefore, the serial port provided via serial interface 30 may be used to retrieve debug information from memory locations and internal registers.

If the MAP bit is negated, then all emulator mode memory references are mapped into supervisor accesses as normal so that the system resources such as on-chip memory, external memory, and input/output devices may be referenced.

Finally, the Go signal is asserted after a "Go" command has been serially shifted into debug module 10 from external development system 7. The Go signal restarts execution of data processor 3 after some event has halted data processor 3, forcing entry into the background debug mode of operation. Data processor 3 may be halted by the assertion of the Breakpoint signal by control circuit 20 if the TDR is programmed to force this type of response. Additionally, data processor 3 may be halted by the execution of a Halt instruction by data processor 3 or the occurrence of a fault-on-fault condition.

Summary

In summary, the present invention provides a data processor and method of operation which allow real time trace and debug functions to be executed without requiring the data processor to enter into a special mode of operation, such as background debug mode. Additionally, the present invention provides a method for executing multi-level triggers during execution of the real time debug functions. Each of these unique features provides an external user with greater functionality and flexibility in identifying and isolating faults in data processing system 5.

As previously mentioned, the present invention provides an important, and hereto non-existent, real time trace function. The real time trace function allows an external user, such as external development system 7, to dynamically observe internal operations of data processor 3 without assuming a type or availability of an external bus. Furthermore, the real time trace function provides such observability into the internal operation of the system without significantly impacting the efficiency and speed of data processing system 5. Debug module 10 of data processing system 5 provides a parallel output port for providing the internal operating information via the DDATA and PST signals to the external user. The DDATA signal provides data which reflects operand values and the PST signals provide encoded status information which reflects an execution status of CPU 2. Furthermore, the DDATA signal also provides captured instruction address program flow changes to allow an external development system to trace an exact program flow without requiring an externally visible address bus or an externally visible data bus. Note that the information displayed on the DDATA signal is synchronized with the status information on the PST signals. Therefore, an external user is able to decode the DDATA and PST signals to determine a status of key variables in data processor 3 without suspending normal operation of data processor 3. Stated another way, data processor 3 is not required to operate in a special debug or emulator mode to provide internal information to an external development system.

Additionally, the present invention provides a circuit and method for executing real time debug functions. In many data processors, especially embedded systems, the data processor may not be halted during a debug operation due to system constraints or an inability to identify a failing circuit or program when the data processor is no longer operating in a normal mode. The present invention executes the debug operation by only minimally intruding on the real time operation of the data processor and without halting the data processor.

Breakpoint operations are typically used during a debugging operation to identify a programming event. When the programming event is encountered, a breakpoint signal is asserted and data is retrieved to determine a status of a software program. Like the trace function, the breakpoint operation allows an external user to ascertain a status of each of a plurality of selected registers and memory locations such that data processing errors may be identified. The present invention provides the plurality of hardware breakpoint registers 50 and breakpoint circuit 100 to perform such breakpoint operations. In the present invention, breakpoint operations based on a value of the program counter or a program counter mask, an operand address range, and a data value or data mask value are all implemented. Additionally, the breakpoint operations implemented in the present invention may also be configured into one or two-level triggers wherein an exact trigger response is programmable via the Trigger Definition Register (TDR) of the plurality of control registers 40.

As well, the present invention provides concurrent operation of CPU 2 and debug module 10 without requiring data processor 3 to operate in a special debug mode. The use of K-Bus 25 to communicate data, address, and control information between core 9 and debug module 10 allows debug module 10 to have access the same internal registers and memory locations as CPU 2. Therefore, debug module may access all the memory locations and internal registers that CPU 2 is able to access. The ability to concurrently operate CPU 2 and debug module 10 allows external development system 7 to have increased visibility in the internal registers and memory of data processor 3 without significantly impacting operation of the processor.

Furthermore, while debug module 10 and CPU 2 both have the ability to access the same internal registers and memory locations, CPU 2 and a remaining portion of core 9 may not modify a value stored in the plurality of breakpoint registers 50 when the Inhibit Processor Writes to Debug Registers (IPW) bit in the CSR of the plurality of control registers 40 is set When the IPW bit in the CSR is set, any write operations initiated by CPU 2 are inhibited. Furthermore, the IPW bit may only be modified by a command provided by external development system 7. The use of the IPW bit to effectively disable write operations to the plurality of hardware breakpoint registers 50 ensures that an event programmed by external development system 7 and required to isolate and identify failing circuitry and erroneous programs in data processor 3 will not be overwritten by CPU 2.

Furthermore, the present invention provides a mechanism to allow external development system 7 to execute a breakpoint operation in data processor 3 before an exception processing routine for a reset operation is initiated. When the External Reset signal is asserted, the contents of each of the plurality of control registers 40 are initialized. When the External Reset signal is subsequently negated, a window of time exists in which data processor 3 is quiescent before beginning an actual reset exception processing routine. If an external breakpoint signal, $\overline{\text{BKPT}}$ is asserted during the quiescent time by external development system 7, the present invention provides a mechanism and method for downloading a target memory value into data processing system 5 such that any hardware register configuration may be performed. The target memory value may be a single value or a plurality of values.

This ability to execute a breakpoint operation before a reset exception processing routine is executed also allows external development system 7 to bypass programming any non-volatile memory storage. By loading the new software image into writable memory storage, the code programmed in the non-volatile storage memory can be easily bypassed. External development system 7 may access any hardware register by shifting in an eighty bit instruction. The eighty bit instruction includes a sixteen bit opcode, a thirty-two bit address mapped into CPU space, and thirty-two bits of operand data. Once the complete command is received, debug module 10 operates in a manner similar to a memory referencing operation. K-Bus 25 is requested, then granted by CPU 2. A CPU-space K-Bus cycle is initiated by debug module 10 and the appropriate hardware register is written.

The ability of the present invention to breakpoint data processor 3 before execution of the reset exception processing routine proves an efficient and useful mechanism for allowing external development system 7 to configure data processor 3 in a required manner without a chance that the values will be overwritten during execution of the reset exception processing routine.

The implementation of the invention described herein is provided by way of example only. However, many other implementations may exist for executing the function described herein. While the present invention has been illustrated and described with reference to specific embodiments, further modifications and improvements will occur to those skilled in the art. It is to be understood, therefore, that this invention is not limited to the particular forms illustrated and that the appended claims cover all modifications that do not depart from the scope of this invention.

We claim:

1. A data processor, comprising:
   a central processing unit for executing a plurality of data processing instructions;
   a breakpoint register for storing a breakpoint value, the breakpoint register coupled to the central processing unit for communicating the breakpoint value; and
   a first control register for storing a processor inhibit value, the processor inhibit value selectively inhibiting the central processing unit from executing a data processing instruction which modifies the breakpoint value stored in the breakpoint register.

2. The data processor of claim 1, further comprising:
   a breakpoint circuit coupled to the breakpoint register for receiving the breakpoint value and coupled to the first control register for receiving the processor inhibit value, the breakpoint circuit disabling the central processing unit from executing the data processing instruction which modifies the breakpoint value stored in the breakpoint register when the processing inhibit value has a first logic value.

3. The data processor of claim 1 further comprising:
   an interface circuit for receiving a command from an external development system, wherein the command from the external development system modifies the breakpoint value stored in the breakpoint register.

4. The data processor of claim 1 further comprising:
   an interface circuit for receiving a command from an external development system, wherein the command from the external development system modifies the processor inhibit value.

5. The data processor of claim 4 wherein only the command from the external development system modifies the processor inhibit value.

6. The data processor of claim 1 wherein the control register stores a plurality of control values including the processor inhibit value.

7. The data processor of claim 6 wherein the central processing unit may modify each of the plurality of control values excluding the processor inhibit value.

8. A method for executing a debug operation in a data processor, comprising:
   providing a central processing unit for executing a plurality of data processing instructions;
   storing a breakpoint value in a breakpoint register, the breakpoint register coupled to the central processing unit for communicating the breakpoint value;
   storing a processor inhibit value in a first control register; and
   selectively inhibiting the central processing unit from executing a data processing instruction which modifies the breakpoint value stored in the breakpoint register when the processor inhibit value is a first logic value.

9. The method of claim 8, further comprising:
   providing a breakpoint circuit coupled to the breakpoint register for receiving the breakpoint value and coupled to the first control register for receiving the processor inhibit value; and
   enabling the breakpoint circuit to inhibit the central processing unit's execution of the data processing instruction which modifies the breakpoint value stored in the breakpoint register when the processor inhibit value is the first logic value.

10. The method of claim 8 further comprising:
    receiving a command from an external development system using a serial interface; and
    modifying the breakpoint value stored in the breakpoint register in response to the command from the external development system.

11. The method of claim 8 further comprising:
    receiving a command from an external development system using a serial interface;
    modifying the processor inhibit value stored in the control register in response to the command from the external development system.

12. The method of claim 11 wherein only the command from the external development system modifies the processor inhibit value.

13. The method of claim 8 wherein the control register stores a plurality of control values including the processor inhibit value.

14. The method of claim 13 wherein the central processing unit may modify each of the plurality of control values excluding the processor inhibit value.

15. A method for modifying a breakpoint value in a data processor, comprising:

receiving a command to store a processor inhibit value in a first control register in the data processor from an external development system;

storing the processor inhibit value in the first control register in the data processor;

storing a first breakpoint value in a first breakpoint register;

providing the processor inhibit value to a breakpoint circuit;

enabling the breakpoint circuit to inhibit execution of a data processing operation which modifies the first breakpoint value in the first breakpoint register when the data processing operation is initiated by the data processor; and enabling the breakpoint circuit to execute the data processing operation which modifies the first breakpoint value in the first breakpoint register when the data processing operation is initiated by a development system external to the data processor.

16. The method of claim 15 further comprising:

storing a second breakpoint value in a second breakpoint register;

enabling the breakpoint circuit to inhibit execution of a data processing operation which modifies the second breakpoint value in the second breakpoint register when the data processing operation is initiated by the data processor; and enabling the breakpoint circuit to execute the data processing operation which modifies the second breakpoint value in the second breakpoint register when the data processing operation is initiated by a development system external to the data processor.

* * * * *